(12) United States Patent     (10) Patent No.:     US 12,598,401 B2
Watanabe                          (45) Date of Patent:     Apr. 7, 2026

(54) SOLID IMAGING DEVICE, ELECTRONIC DEVICE, AND METHOD OF CONTROLLING SOLID IMAGING DEVICE

(71) Applicant: Sony Semiconductor Solutions Corporation, Kanagawa (JP)

(72) Inventor: Tsuyoshi Watanabe, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 143 days.

(21) Appl. No.: 18/551,060

(22) PCT Filed: Mar. 8, 2022

(86) PCT No.: PCT/JP2022/009920
§ 371 (c)(1),
(2) Date: Sep. 18, 2023

(87) PCT Pub. No.: WO2022/202277
PCT Pub. Date: Sep. 29, 2022

(65) Prior Publication Data
US 2024/0163574 A1     May 16, 2024

Related U.S. Application Data

(60) Provisional application No. 63/165,868, filed on Mar. 25, 2021.

(51) Int. Cl.
*H04N 25/13*     (2023.01)
*G06T 7/00*      (2017.01)
*H04N 25/75*     (2023.01)

(52) U.S. Cl.
CPC ......... *H04N 25/135* (2023.01); *G06T 7/0012* (2013.01); *H04N 25/75* (2023.01); *G06T 2207/30101* (2013.01)

(58) Field of Classification Search
CPC ...... H04N 25/135; H04N 25/75; H04N 23/12; G06T 7/0012; G06T 2207/30101;
(Continued)

(56) References Cited

U.S. PATENT DOCUMENTS

| | | | | | |
|---|---|---|---|---|---|
| 2010/0321522 A1* | 12/2010 | Seto | ..................... | H04N 23/673 |
| | | | | 348/E9.051 |
| 2016/0065926 A1* | 3/2016 | Nonaka | .................. | H04N 23/88 |
| | | | | 348/164 |
| 2018/0182095 A1* | 6/2018 | Li | ........................ | H04N 1/6008 |

FOREIGN PATENT DOCUMENTS

| | | | | | |
|---|---|---|---|---|---|
| EP | 3703363 A1 * | 9/2020 | ........... | G06T 3/4007 |
| JP | 2016052041 A | 4/2016 | | |

(Continued)

OTHER PUBLICATIONS

International Search Report (PCT/ISA/210), International Application No. PCT/JP2022/009920, dated May 24, 2022.

*Primary Examiner* — Nhan T Tran
(74) *Attorney, Agent, or Firm* — Michael Best & Friedrich LLP

(57)     ABSTRACT
A cost increase is controlled. A solid imaging device according to an embodiment includes: an imaging section (101) that obtains first image data including four or more colors; and a converting section (104) that reduces the number of colors of the first image data obtained by the imaging section and generates second image data having a smaller number of colors than the first image data.

10 Claims, 15 Drawing Sheets

(58) Field of Classification Search
CPC . G06T 2207/30048; G06T 2207/30061; G06T
2207/30104
See application file for complete search history.

(56) References Cited

FOREIGN PATENT DOCUMENTS

| | | | | | |
|---|---|---|---|---|---|
| JP | 2018082259 | A | | 5/2018 | |
| JP | 2018201015 | A | | 12/2018 | |
| JP | 2019080245 | A | * | 5/2019 | ........... G06T 3/4007 |
| WO | 2017010261 | A1 | | 1/2017 | |

* cited by examiner

FIG.6

| | 51 | | 30B | 30Cy | | | | | |
|---|---|---|---|---|---|---|---|---|---|
| 30G | G | Y | B | Cy | G | Y | B | Cy | ... |
| 30Y | Y | G | Cy | B | Y | G | Cy | B | ... |
| 30R | R | Ma | G | Y | R | Ma | G | Y | ... |
| 30Ma | Ma | R | Y | G | Ma | R | Y | G | ... |
| | G | Y | B | Cy | G | Y | B | Cy | ... |
| | Y | G | Cy | B | Y | G | Cy | B | ... |
| | R | Ma | G | Y | R | Ma | G | Y | ... |
| | Ma | R | Y | G | Ma | R | Y | G | ... |

FIG.7

| | 52 | 30Y | 30Cy | 30G | | | | | |
|---|---|---|---|---|---|---|---|---|---|
| 30Ma | Ma | Y | R | G | Ma | Y | R | G | ... |
| 30W | W | Cy | Bl | B | W | Cy | Bl | B | ... |
| 30R | R | G | Ma | Cy | R | G | Ma | Cy | ... |
| 30Bl | Bl | B | W | Y | Bl | B | W | Y | ... |
| 30B | Ma | Y | R | G | Ma | Y | R | G | ... |
| | W | Cy | Bl | B | W | Cy | Bl | B | ... |
| | R | G | Ma | Cy | R | G | Ma | Cy | ... |
| | Bl | B | W | Y | Bl | B | W | Y | ... |

FIG.18

SOLID IMAGING DEVICE, ELECTRONIC DEVICE, AND METHOD OF CONTROLLING SOLID IMAGING DEVICE

FIELD

The present disclosure relates to a solid imaging device, an electronic device, and a method of controlling a solid imaging device.

BACKGROUND

In recent years, a so-called multispectral imaging device including pixels that receive, in addition to light of three primary colors of red (R), green (G), and blue (B), light of another wavelength component has been developed.

CITATION LIST

Patent Literature

Patent Literature 1: Japanese Patent Application Laid-open No. 2018-201015

SUMMARY

Technical Problem

However, image data obtained by a multispectral imaging device includes, in addition to color information of three primary colors of red (R), green (G), and blue (B), color information of another wavelength component. Thus, there has been a problem that an existing application developed for color images of the three primary colors of RGB cannot be used as it is, it is necessary to redesign the application in such a manner as to correspond to a multispectral color image, and a development cost, device cost, and the like are increased.

Thus, the present disclosure proposes a solid imaging device, an electronic device, and a method of controlling the solid imaging device that are capable of controlling a cost increase.

Solution to Problem

To solve the problems described above, a solid imaging device according to an embodiment of the present disclosure includes: an imaging section that obtains first image data including four or more colors; and a converting section that reduces a number of colors of the first image data obtained by the imaging section and generates second image data having a smaller number of colors than the first image data.

Moreover, a solid imaging device according to another embodiment of the present disclosure includes: an imaging section that obtains first image data including four or more colors; and a processing section that executes predetermined processing on the first image data.

BRIEF DESCRIPTION OF DRAWINGS

FIG. 6 is a plan diagram depicting a plane layout example of a pixel array according to a first layout example of the one embodiment of the present disclosure.

FIG. 7 is a plan diagram depicting a plane layout example of a pixel array according to a second layout example of the one embodiment of the present disclosure.

FIG. 18 is a block diagram depicting an example of schematic configuration of a vehicle control system.

DESCRIPTION OF EMBODIMENTS

Figure 1:
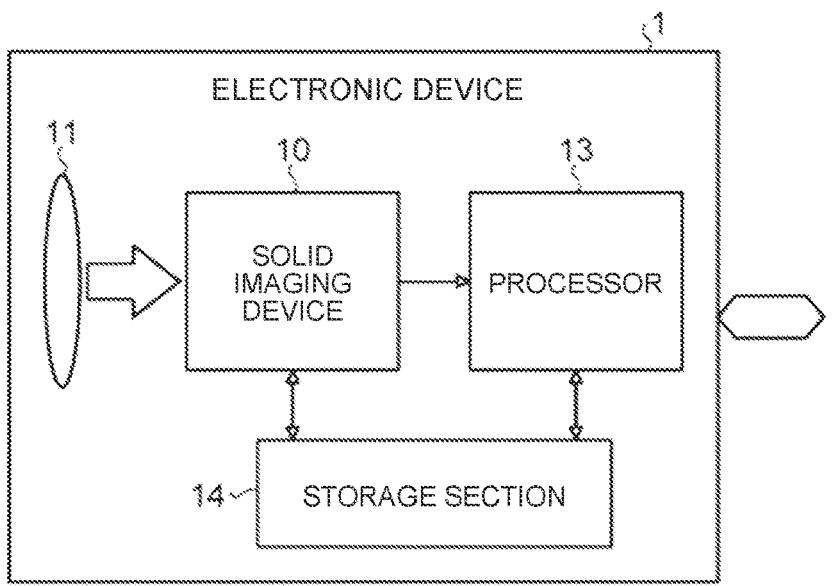
FIG. 1 is a block diagram depicting a schematic configuration example of an electronic device including a solid imaging device according to one embodiment of the present disclosure.

Hereinafter, one embodiment of the present disclosure will be described in detail on the basis of the drawings. Note that in the following embodiment, overlapped description is omitted by assignment of the same reference sign to the same parts.

Furthermore, the present disclosure will be described in the following order of items.

1. One embodiment
1.1 Configuration example of an electronic device (imaging device)
1.2 Configuration example of a solid imaging device
1.3 Configuration example of a pixel
1.4 Basic functional example of the pixel
1.5 Stacked structure example of the solid imaging device
1.6 Example of a pixel array compatible with multispectrum
1.6.1 First layout example
1.6.2 Second layout example
1.7 Specific example of an electronic device
1.7.1 First example
1.7.2 Second example
1.7.3 Third example
1.8 Example of output timing
1.8.1 Example of output timing of color temperature information
1.8.2 Example of output timing of specific wavelength image data
1.9 Conclusion
1.10 Modification example
1.10.1 First modification example
1.10.2 Second modification example
1.10.3 Third modification example
2. Hardware configuration
3. Example of application to a smartphone
4. Example of application to a mobile body
5. Example of application to an endoscopic surgery system

1. One Embodiment

One embodiment of the present disclosure will be described in detail with reference to the drawings. Note that in the present embodiment, a case where a technology according to the present embodiment is applied to a complementary metal-oxide-semiconductor (CMOS)-type solid imaging device (hereinafter, also referred to as an image sensor) will be described as an example. However, this is not a limitation. For example, the technology according to the present embodiment can be applied to various sensors including a photoelectric conversion element, such as a charge coupled device (CCD)-type solid imaging device, a time of flight (ToF) sensor, or an event-based vision sensor (EVS). Note that the CMOS-type solid imaging device may be an image sensor created by application or partial utilization of a CMOS process.

1.1 Configuration Example of an Electronic Device (Imaging Device)

FIG. 1 is a block diagram depicting a schematic configuration example of an electronic device (imaging device) including a solid imaging device according to the present embodiment. As depicted in FIG. 1, an electronic device 1 includes, for example, an imaging lens 11, a solid imaging device 10, a storage section 14, and a processor 13.

The imaging lens 11 is an example of an optical system that collects incident light and forms an image thereof on a light receiving surface of the solid imaging device 10. The light receiving surface may be a surface, on which photoelectric conversion elements are arrayed, in the solid imaging device 10. The solid imaging device 10 photoelectrically converts the incident light and generates image data. Furthermore, the solid imaging device 10 executes predetermined signal processing such as a noise removal and a white balance adjustment on the generated image data.

The storage section 14 includes, for example, a flash memory, a dynamic random access memory (DRAM), a static random access memory (SRAM), or the like, and records the image data or the like input from the solid imaging device 10.

The processor 13 is configured by utilization of, for example, a central processing unit (CPU) or the like, and may include an application processor that executes an operating system, various kinds of application software, or the like, a graphics processing unit (GPU), a baseband processor, and the like. With respect to the image data input from the solid imaging device 10, the image data read from the storage section 14, and the like, the processor 13 executes various kinds of processing as necessary, executes a display to the user, and performs transmission to the outside via a predetermined network.

1.2 Configuration Example of a Solid Imaging Device

Figure 2:
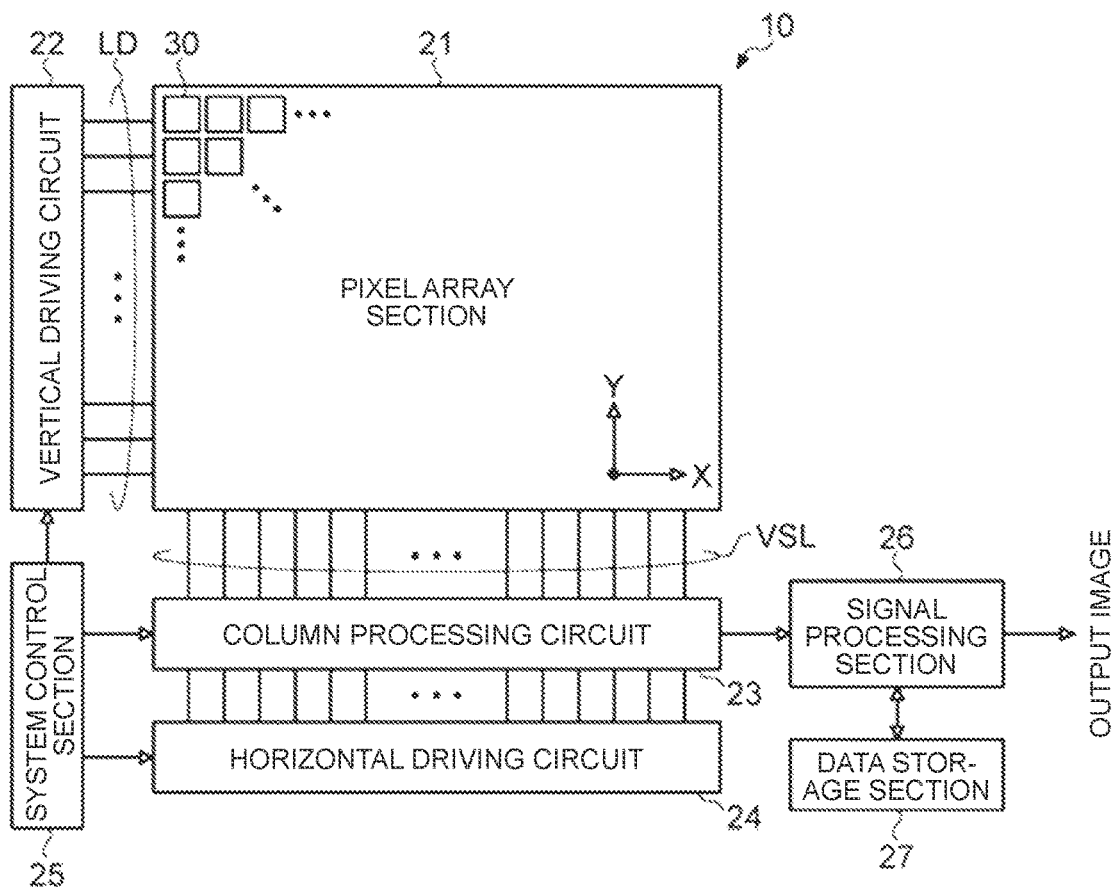
FIG. 2 is a block diagram depicting a schematic configuration example of a CMOS-type solid imaging device according to the one embodiment of the present disclosure.

FIG. 2 is a block diagram depicting a schematic configuration example of a CMOS-type solid imaging device according to the present embodiment. The solid imaging device 10 according to the present embodiment may include, for example, a back-illuminated image sensor.

Figure 4:
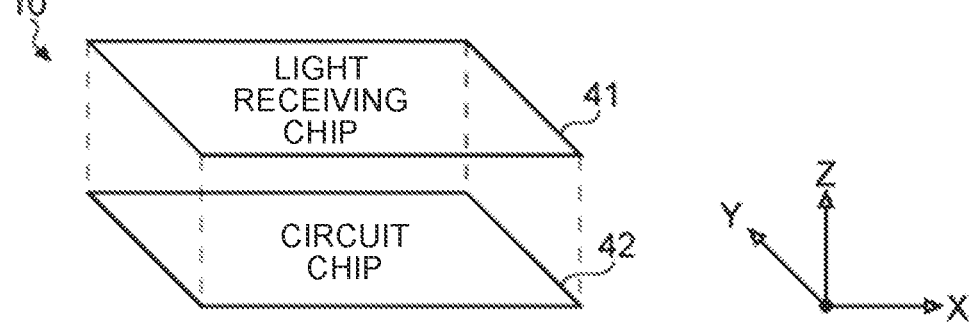
FIG. 4 is a diagram depicting a stacked structure example of an image sensor according to the one embodiment of the present disclosure.

The solid imaging device 10 according to the present embodiment has, for example, a stack structure in which a light receiving chip 41 (substrate) on which a pixel array section 21 is arranged and a circuit chip 42 (substrate) on which a peripheral circuit is arranged are stacked (see, for example, FIG. 4). The peripheral circuit may include, for example, a vertical driving circuit 22, a column processing circuit 23, a horizontal driving circuit 24, and a system control section 25.

The solid imaging device 10 further includes a signal processing section 26 and a data storage section 27. The signal processing section 26 and the data storage section 27 may be provided on the same semiconductor chip as the peripheral circuit, or may be provided on another semiconductor chip.

The pixel array section 21 has a configuration in which pixels 30 each of which has a photoelectric conversion element that generates and accumulates charges corresponding to an amount of received light are arranged in a row direction and a column direction, that is, in a two-dimensional lattice shape in a matrix. Here, the row direction means an array direction of pixels in a pixel row (lateral direction in the drawing), and the column direction means an array direction of pixels in a pixel column (longitudinal direction in the drawing). A specific circuit configuration and pixel structure of the pixel 30 will be described later in detail.

In the pixel array section 21, pixel driving lines LD are wired in the row direction for each pixel row, and vertical signal lines VSL are wired in the column direction for each pixel column with respect to the pixel array in the matrix. The pixel driving line LD transmits a drive signal for performing driving of when a signal is read from a pixel. Although illustrated as wiring lines one by one in FIG. 2, pixel driving lines LD are not limited to be arranged one by one. One end of each of the pixel driving lines LD is connected to an output end corresponding to each row of the vertical driving circuit 22.

The vertical driving circuit 22 includes a shift register, an address decoder, and the like, and drives pixels of the pixel array section 21 at the same time with respect to all the pixels or in units of rows. That is, the vertical driving circuit 22 and the system control section 25 that controls the vertical driving circuit 22 are included in a driving section that controls an operation of each of the pixels of the pixel array section 21. This vertical driving circuit 22 generally includes two scanning systems, which are a readout scanning system and a sweeping scanning system, although illustration of a specific configuration thereof is omitted.

The readout scanning system selectively scans the pixels 30 of the pixel array section 21 sequentially in units of rows in order to read out signals from the pixels 30. The signals read from the pixels 30 are analog signals. The sweeping scanning system performs sweeping scanning on a readout row, on which readout scanning is performed by the readout scanning system, prior to the readout scanning for an exposure time.

By the sweeping scanning by the sweeping scanning system, unnecessary charges are swept out from the photoelectric conversion element of each of the pixels 30 in a readout row, whereby the photoelectric conversion element is reset. Then, by sweeping out (resetting) of the unnecessary charges by the sweeping scanning system, a so-called electronic shutter operation is performed. Here, the electronic shutter operation means an operation of discarding charges of the photoelectric conversion elements and newly starting exposure (starting accumulation of charges).

A signal read by the readout operation by the readout scanning system corresponds to an amount of light received after the immediately preceding readout operation or the electronic shutter operation. Then, a period from readout timing by the immediately preceding readout operation or sweeping timing by the electronic shutter operation to readout timing by the current readout operation is a charge accumulation period (also referred to as an exposure period) in the pixels 30.

A signal output from each of the pixels 30 of the pixel row selectively scanned by the vertical driving circuit 22 is input to the column processing circuit 23 through each of the vertical signal lines VSL for each pixel column. The column processing circuit 23 performs predetermined signal processing on the signal output from each of the pixels of the selected row through the vertical signal line VSL for each pixel column of the pixel array section 21, and temporarily holds a pixel signal after the signal processing.

Specifically, the column processing circuit 23 performs, as the signal processing, at least noise removal processing such as correlated double sampling (CDS) processing or double data sampling (DDS) processing. For example, a fixed pattern noise unique to a pixel, such as a reset noise and a threshold variation of an amplification transistor in the pixel is removed by the CDS processing. The column processing circuit 23 also has, for example, an analog-digital (AD) conversion function, converts an analog pixel signal read from each of the photoelectric conversion elements into a digital signal, and outputs the digital signal.

The horizontal driving circuit 24 includes a shift register, an address decoder, and the like, and sequentially selects readout circuits corresponding to the pixel columns of the column processing circuit 23 (hereinafter, also referred to as pixel circuits). By the selective scanning by the horizontal driving circuit 24, the pixel signals on which the signal processing is performed in each of the pixel circuits in the column processing circuit 23 are sequentially output.

The system control section 25 includes a timing generator that generates various timing signals, and the like, and performs driving control of the vertical driving circuit 22, the column processing circuit 23, the horizontal driving circuit 24, and the like on the basis of various kinds of timing generated by the timing generator.

The signal processing section 26 has at least an arithmetic processing function, and performs various kinds of signal processing such as arithmetic processing on the pixel signals output from the column processing circuit 23. In the signal processing in the signal processing section 26, the data storage section 27 temporarily stores data necessary for the processing.

Note that the image data output from the signal processing section 26 may be, for example, subjected to predetermined processing in the processor 13 or the like in the electronic device 1 including the solid imaging device 10, or transmitted to the outside via a predetermined network.

1.3 Configuration Example of a Pixel

Figure 3:
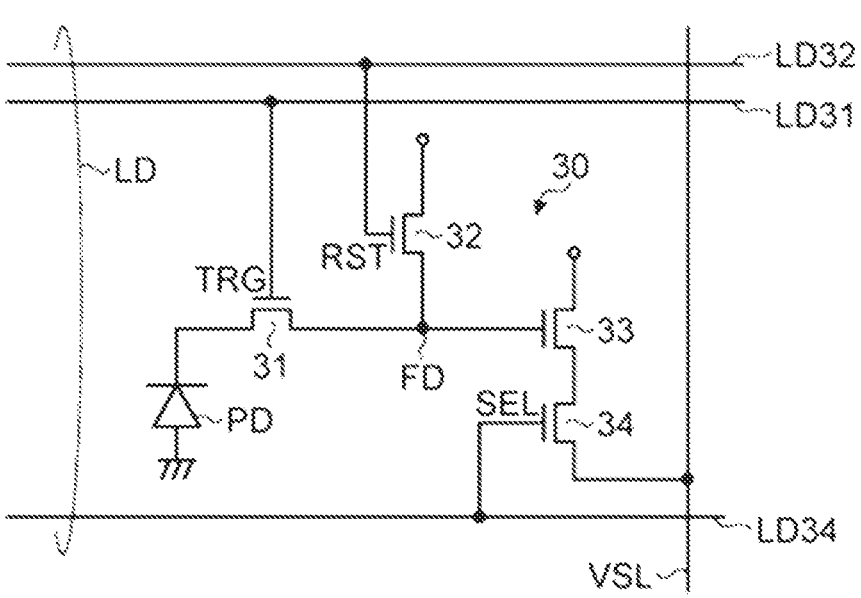
FIG. 3 is a circuit diagram depicting a schematic configuration example of a pixel according to the one embodiment of the present disclosure.

FIG. 3 is a circuit diagram depicting a schematic configuration example of a pixel according to the present embodiment. As depicted in FIG. 3, each of the pixels 30 includes a photoelectric conversion section PD, a transfer transistor 31, a reset transistor 32, an amplification transistor 33, a selection transistor 34, and a floating diffusion region FD.

A selection transistor driving line LD34 included in the pixel driving lines LD is connected to a gate of the selection transistor 34, a reset transistor driving line LD32 included in the pixel driving lines LD is connected to a gate of the reset transistor 32, and a transfer transistor driving line LD31 included in the pixel driving lines LD is connected to a gate of the transfer transistor 31. Furthermore, a vertical signal line VSL one end of which is connected to the column processing circuit 23 is connected to a source of the amplification transistor 33 via the selection transistor 34.

In the following description, the reset transistor 32, the amplification transistor 33, and the selection transistor 34 are also collectively referred to as a pixel circuit. This pixel circuit may include the floating diffusion region FD and/or the transfer transistor 31.

The photoelectric conversion section PD photoelectrically converts incident light. The transfer transistor 31 transfers charges generated in the photoelectric conversion section PD. The floating diffusion region FD functions as a charge accumulating section that accumulates the charges transferred by the transfer transistor 31. The amplification transistor 33 causes a pixel signal of a voltage value corresponding to the charges accumulated in the floating diffusion region FD to appear in the vertical signal line VSL. The reset transistor 32 releases the charges accumulated in the floating diffusion region FD. The selection transistor 34 selects the pixel 30 to be a target of readout.

An anode of the photoelectric conversion section PD is grounded, and a cathode thereof is connected to a source of the transfer transistor 31. A drain of the transfer transistor 31 is connected to a source of the reset transistor 32 and a gate of the amplification transistor 33, and a node that is a connection point of these configures the floating diffusion region FD. Note that the drain of the reset transistor 32 is connected to a vertical reset input line (not depicted).

A drain of the amplification transistor 33 is connected to a vertical voltage supplying line (not depicted). The source of the amplification transistor 33 is connected to a drain of the selection transistor 34, and a source of the selection transistor 34 is connected to the vertical signal line VSL.

Potential of the floating diffusion region FD is determined depending on charges accumulated therein and capacitance of the floating diffusion region FD. The capacitance of the floating diffusion region FD is determined depending on capacitance of a diffusion layer of the drain of the transfer transistor 31, capacitance of a source diffusion layer of the reset transistor 32, capacitance of the gate of the amplification transistor 33, and the like in addition to the capacitance-to-ground.

1.4 Basic Functional Example of the Pixel

Next, a basic function of each of the pixels 30 will be described with reference to FIG. 3. The reset transistor 32 controls discharge (reset) of the charges, which are accumulated in the floating diffusion region FD, in accordance with a reset signal RST supplied from the vertical driving circuit 22 via the reset transistor driving line LD32. Note that by turning on the transfer transistor 31 when the reset transistor 32 is in an ON state, it is also possible to discharge (reset) the charges accumulated in the photoelectric conversion section PD in addition to the charges accumulated in the floating diffusion region FD.

When the reset signal RST at a High level is input to the gate of the reset transistor 32, the potential of the floating diffusion region FD is clamped to a voltage applied through the vertical reset input line. As a result, the charges accumulated in the floating diffusion region FD are discharged (reset).

Furthermore, when the reset signal RST at a Low level is input to the gate of the reset transistor 32, the floating diffusion region FD is electrically disconnected from the vertical reset input line and enters a floating state.

The photoelectric conversion section PD photoelectrically converts incident light and generates charges corresponding to an amount of the light. The generated charges are accumulated on a side of a cathode of the photoelectric conversion section PD. The transfer transistor 31 controls a transfer of the charges from the photoelectric conversion section PD to the floating diffusion region FD in accordance with a transfer control signal TRG supplied from the vertical driving circuit 22 via the transfer transistor driving line LD31.

For example, when the transfer control signal TRG at a High level is input to the gate of the transfer transistor 31, the charges accumulated in the photoelectric conversion section PD is transferred to the floating diffusion region FD. On the other hand, when the transfer control signal TRG at a Low level is supplied to the gate of the transfer transistor 31, the transfer of the charges from the photoelectric conversion section PD is stopped.

As described above, the potential of the floating diffusion region FD of when the reset transistor 32 is off is determined depending on the amount of charges transferred from the photoelectric conversion section PD via the transfer transistor 31 and the capacitance of the floating diffusion region FD.

The amplification transistor 33 functions as an amplifier with a potential variation in the floating diffusion region FD connected to the gate thereof being an input signal, and an output voltage signal thereof appears as a pixel signal in the vertical signal line VSL via the selection transistor 34.

According to a selection control signal SEL supplied from the vertical driving circuit 22 via the selection transistor driving line LD34, the selection transistor 34 controls the appearance of the pixel signal in the vertical signal line VSL due to the amplification transistor 33. For example, when the High level selection control signal SEL is input to the gate of the selection transistor 34, a pixel signal by the amplification transistor 33 appears in the vertical signal line VSL. On the other hand, when the selection control signal SEL at a Low level is input to the gate of the selection transistor 34, the appearance of the pixel signal in the vertical signal line VSL is stopped. As a result, it becomes possible to extract only an output of the selected pixel 30 in the vertical signal line VSL to which the plurality of pixels 30 is connected.

1.5 Stacked Structure Example of the Solid Imaging Device

FIG. 4 is a diagram depicting a stacked structure example of the solid imaging device according to the present embodiment. As depicted in FIG. 4, the solid imaging device 10 has a structure in which a light receiving chip 41 and a circuit chip 42 are vertically stacked. The light receiving chip 41 has a structure in which the light receiving chip 41 and the circuit chip 42 are stacked. The light receiving chip 41 is, for example, a semiconductor chip including the pixel array section 21 in which the photoelectric conversion sections PD are arrayed, and the circuit chip 42 is, for example, a semiconductor chip in which pixel circuits are arrayed.

For bonding of the light receiving chip 41 and the circuit chip 42, for example, so-called direct bonding in which bonded surfaces are flattened and are bonded to each other by force between electrons can be used. However, this is not a limitation, and for example, so-called Cu—Cu bonding in which copper (Cu) electrode pads formed on the bonded surfaces are bonded to each other, bump bonding, or the like can also be used.

In addition, the light receiving chip 41 and the circuit chip 42 are electrically connected via a connecting section such as a through-silicon via (TSV) that is a through contact penetrating a semiconductor substrate, for example. For the connection using the TSV, for example, a so-called twin TSV method in which two TSVs that are a TSV provided in the light receiving chip 41 and a TSV provided from the light receiving chip 41 to the circuit chip 42 are connected on outer surfaces of the chips, a so-called shared TSV method in which the both are connected by a TSV penetrating from the light receiving chip 41 to the circuit chip 42, or the like can be employed.

However, when Cu—Cu bonding or bump bonding is used for bonding of the light receiving chip 41 and the circuit chip 42, the both are electrically connected via a Cu—Cu bonding section or a bump bonding section.

1.6 Example of a Pixel Array Compatible with Multispectrum

In the present embodiment, the pixel array section 21 of the solid imaging device 10 includes, in addition to the pixels 30 that receive light of wavelength components of the three primary colors of red (R), green (G), and blue (B), the pixels 30 that receive light of another wavelength component. The wavelength component received by each of the pixels 30 is determined according to a wavelength transmission characteristic of a color filter included in each of the pixels 30 and a semiconductor material included in the photoelectric conversion section PD. Thus, in order to support multispectrum (also referred to as hyperspectrum), that is, in order to generate a color image including luminance information (such as a pixel value) of another wavelength component in addition to the three primary colors, the pixel array section 21 according to the present embodiment includes, in addition to the color filters that respectively transmit light of the wavelength components of red (R), green (G), and blue (B), at least one color filter that transmits light of another wavelength component (such as cyan (Cy), magenta (Ma), yellow (Y), infrared (IR) (including near infrared), white (W), black (B), gray (Gr), or the like).

Here, the multispectrum in the present description basically indicates that luminance information of light of another wavelength component is included in addition to luminance information of color components included in a color image (such as luminance information of three primary colors of RGB or four primary colors of CMYK). For example, in a case where the number of colors of the color image is three colors of the three primary colors of RGB, a multispectral image may be an image including four or more colors including a color of light of another wavelength component in addition to the three colors. However, the present embodiment is not limited to this, and various modifications may be made as long as luminance information of light of another wavelength component is included in addition to luminance information of light of wavelength components generally obtained for image formation, that is, luminance information of light of another wavelength component is included in addition to luminance information for configuration of a binary or grayscale monochrome image, for example.

Note that, in the present disclosure, for example, the pixels 30 that obtain luminance information included in a color image including the three primary colors of RGB (for example, corresponding to pixels 30R, 30G, and 30B (described later)) are also referred to as first to third pixels, and the pixel 30 that obtains luminance information of light of the wavelength component other than the color components included in the color image (for example, corresponding to a pixel 30Cy, 30Ma, 30Y, 30Bl, 30Gr, 30W, or the like (described later)) is also referred to as a fourth pixel.

Figure 5:
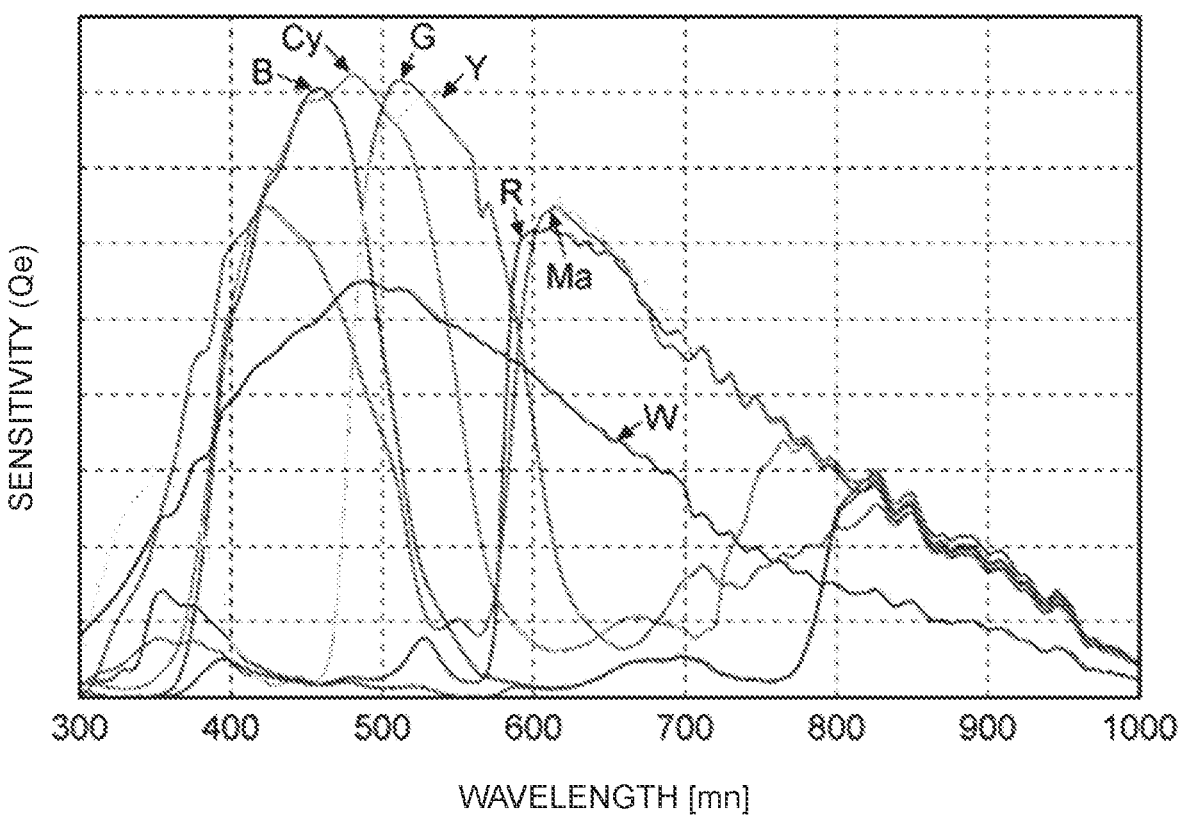
FIG. 5 is a graph depicting an example of wavelength dependence of light receiving sensitivity of a pixel according to the embodiment.

FIG. 5 is a graph depicting an example of wavelength dependence of light receiving sensitivity of a pixel according to the present embodiment. As depicted in FIG. 5, examples of the pixel 30 that can be employed in the present embodiment include a pixel 30 that receives light of a red (R) wavelength component (hereinafter, also referred to as a pixel 30R), a pixel 30 that receives light of a green (G) wavelength component (hereinafter, also referred to as a pixel 30G), a pixel 30 that receives light of a blue (B) wavelength component (hereinafter, also referred to as a pixel 30B), a pixel 30 that receives light of a cyan (Cy) wavelength component (hereinafter, also referred to as a pixel 30Cy), a pixel 30 that receives light of a magenta (Ma) wavelength component (hereinafter, also referred to as a pixel 30Ma), a pixel 30 that receives light of a yellow (Y) wavelength component (hereinafter, also referred to as a pixel 30Y), and a pixel 30 having a broad light sensitivity characteristic with respect to an entire visible light region (hereinafter, also referred to as a pixel 30W). In addition, it is also possible to employ various pixels such as a pixel 30 having a broad light sensitivity characteristic with respect to the entire visible light region which light sensitivity characteristic is lower than that of the pixel 30W (hereinafter, also referred to as a pixel 30Gr), a pixel 30 that receives light of an infrared (IR) wavelength component (hereinafter, also referred to as a pixel 30IR), and two pixels 30Bl each of which includes a light shielding film instead of a color filter.

In the pixel array section 21, the pixels 30 that receive light of each wavelength component are regularly arrayed. Specifically, the pixel array section 21 has a configuration in which a set of the pixels 30 arrayed in m rows and n columns (m and n are natural numbers) is set as a basic pattern and this basic pattern is repeated in a matrix direction (also referred to as a pixel array). One basic pattern includes at least one pixel 30 having a peak of light receiving sensitivity (also referred to as quantum efficiency Qe) for light of each wavelength component.

Examples of a general pixel array (corresponding to a color filter array) include a Bayer array of 2×2 pixels, a color filter array of 3×3 pixels which array is employed in an X-Trans (registered trademark) CMOS sensor (hereinafter, referred to as X-Trans (registered trademark)-type array), and a quad Bayer array of 4×4 pixels (also referred to as a quadra array). Furthermore, as a pixel array corresponding to multispectrum, there are a color filter of 4-4 pixels in which filter a white RGB color filter is combined with the Bayer array (hereinafter, referred to as a white RGB array), and the like.

Hereinafter, a pixel array that is compatible with multispectrum and that can be employed in the present embodiment will be described with some examples.

1.6.1 First Layout Example

FIG. 6 is a plan diagram depicting a plane layout example of a pixel array according to a first layout example. As depicted in FIG. 6, the pixel array section 21 according to the first layout example has a configuration in which a basic pattern 51 in which two pixels 30R, four pixels 30G, two pixels 30B, two pixels 30Cy, two pixels 30Ma, and four pixels 30Y are regularly arranged in four rows and four columns is repeated in the matrix direction.

1.6.2 Second Layout Example

FIG. 7 is a plan diagram depicting a plane layout example of a pixel array according to a second layout example. As depicted in FIG. 7, the pixel array section 21 according to the second layout example has a configuration in which a basic pattern 52 in which two pixels 30W and two pixels 30Bl in addition to two pixels 30R, two pixels 30G, two pixels 30B, two pixels 30Cy, two pixels 30Ma, and two pixels 30Y are regularly arranged in four rows and four columns is repeated in the matrix direction.

However, the above-described pixel array of four rows and four columns is not a limitation, and various pixel arrays may be employed as long as a pixel array includes the pixel 30 that receives light of another wavelength component in addition to the pixels 30R, 30G, and 30B of the three primary colors of RGB. Furthermore, in a case where color elements included in a color image are four primary colors of CMYK, a pixel array including, in addition to the pixels 30Cy, 30Ma, and 30Y, a pixel 30 that receives light of another wavelength component may be employed.

1.7 Specific Example of an Electronic Device

Next, the electronic device 1 in which the pixel array section 21 that is compatible with multispectrum and that is according to the present embodiment is employed will be described with some specific examples.

1.7.1 First Example

Figure 8:
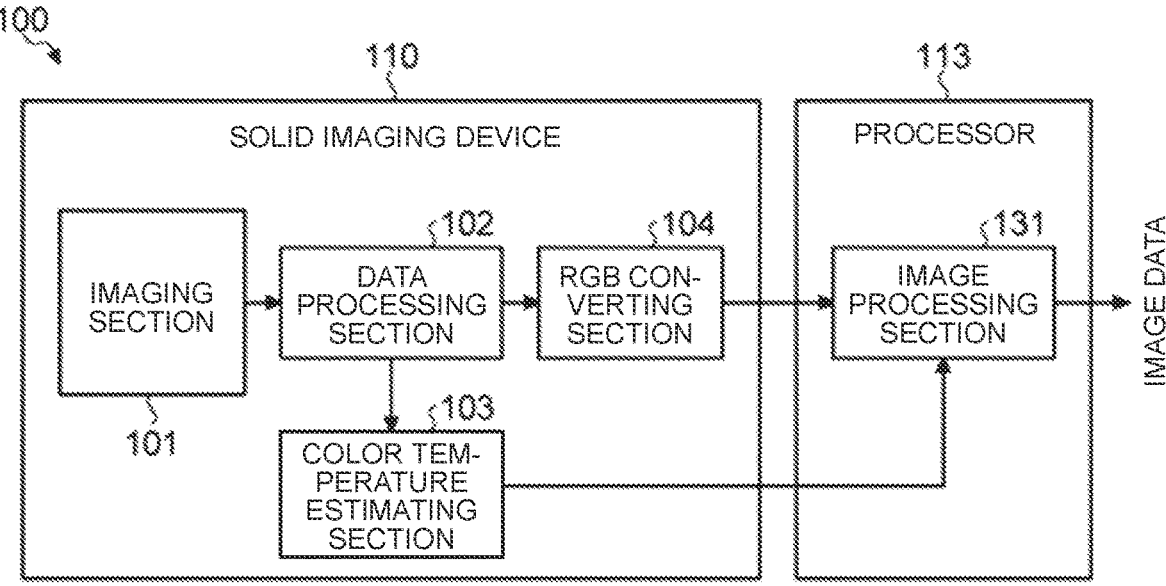
FIG. 8 is a block diagram depicting a schematic configuration example of an electronic device according to a first example of the one embodiment of the present disclosure.

First, a specific example of a case where adjustment accuracy of white balance is improved in the electronic device 1 in which the pixel array section 21 compatible with multispectrum is employed will be described as a first example. FIG. 8 is a block diagram depicting a schematic configuration example of an electronic device according to the first example. Note that although configurations corresponding to the solid imaging device 10 and the processor 13 in the electronic device 1 depicted in FIG. 1 are extracted and depicted in FIG. 8, an electronic device 100 according to the first example may include an additional configuration such as another configuration not extracted from FIG. 1.

As depicted in FIG. 8, the electronic device 100 according to the first example includes a solid imaging device 110 and a processor 113. The solid imaging device 110 corresponds to the solid imaging device 10 in FIG. 1, and the processor 113 corresponds to the processor 13 in FIG. 1.

(Solid Imaging Device 110)

The solid imaging device 110 includes an imaging section 101, a data processing section 102, a color temperature estimating section 103, and an RGB converting section 104.

The imaging section 101 includes, for example, the pixel array section 21, the vertical driving circuit 22, the column processing circuit 23, the horizontal driving circuit 24, and the system control section 25 in FIG. 2, and outputs a multispectral pixel signal read from the pixel array section 21 and subjected to AD conversion.

The data processing section 102 includes, for example, the signal processing section 26 and the data storage section 27 in FIG. 2, and generates image data of multispectrum (hereinafter, also referred to as multispectral image data) by executing predetermined arithmetic processing on the multispectral pixel signal output from the imaging section 101. Note that the predetermined arithmetic processing may include processing executed by a general image sensor, such as defect correction and noise reduction.

The color temperature estimating section 103 includes, for example, a signal processing circuit such as a digital signal processor (DSP) mounted as a peripheral circuit on the circuit chip 42 or the light receiving chip 41 (see FIG. 4), or the signal processing section 26, executes color temperature estimation processing on the multispectral image data on which the signal processing is performed by the data processing section 102, and outputs color temperature information obtained by the color temperature estimation processing to the outside such as the processor 113. This color temperature estimating section 103 may be an example of a processing section in the claims.

In the color temperature estimation processing, for example, image data of one or more specific wavelength components to be used for estimation of color temperature (hereinafter, also referred to as specific wavelength image data) is extracted from the multispectral image data, and the color temperature of the multispectral image data or RGB image data is estimated on the basis of the extracted specific wavelength image data.

Note that a matrix operation such as linear matrix operation or nonnegative matrix factorization (NMF) may be used to extract a specific wavelength from the multispectral image data, for example. Furthermore, various kinds of processing such as artificial intelligence (AI) processing using a learned learning model and rule-based algorithm processing may be employed as all or a part of the extraction processing of the specific wavelength and/or the color temperature estimation processing.

The RGB converting section 104 includes, for example, a signal processing circuit such as a DSP mounted as a peripheral circuit on the circuit chip 42 or the light receiving chip 41 (see FIG. 4), or the signal processing section 26, converts the multispectral image data into image data including the three primary colors of RGB (hereinafter, also referred to as RGB image data), and outputs the RGB image data obtained by the conversion to the outside such as the processor 113. That is, the RGB converting section 104 functions as a converting section that reduces the number of colors of the multispectral image data and that generates image data having a smaller number of colors than the multispectral image data.

For example, the conversion from the multispectral image data to the RGB image data may be executed by extraction of RGB pixel values from the multispectral image data, or may be executed by interpolation of pixel values of other than the RGB three primary colors in the multispectral image data with the pixel values of the RGB three primary colors. In the former case, resolution of the RGB image data may become lower than resolution of the multispectral image data (in this case, a data amount is reduced). In the latter case, resolution of the RGB image data and resolution of the multispectral image data may be equivalent.

(Processor 113)

The processor 113 includes, for example, an image processing section 131 that executes predetermined image processing on the RGB image data input from the RGB converting section 104. At that time, on the basis of the color temperature information input from the color temperature estimating section 103, the image processing section 131 may execute image processing such as a white balance adjustment on the RGB image data.

As described above, since the configuration of converting the multispectral image data into the RGB image data in the solid imaging device 110 compatible with multispectrum is included, it is possible to employ an existing application for the RGB image data in the image processing section 131 that executes the image processing on the image data output from the solid imaging device 110. As a result, it becomes possible to avoid redesigning of the application in such a manner as to correspond to the multispectral image data. Thus, it becomes possible to control an increase in a cost such as a development cost or a device cost and an increase in power consumption of the entire electronic device 100.

Furthermore, since the configuration of estimating the color temperature from the multispectral image data in the solid imaging device 110 is included, for example, even in a case where the color temperature information of the image data is used in an external configuration such as the processor 113, it is possible to avoid necessity of supplying the multispectral image data to the external configuration and necessity of processing the multispectral image data in the external configuration. Thus, it becomes possible to control an increase in a cost such as a development cost or a device cost and an increase in power consumption in the entire electronic device 100. Furthermore, in a case where a data amount of the RGB image data is reduced compared to a data amount of the multispectral image data, an amount of data transferred from the solid imaging device 110 to the external configuration can be reduced.

1.7.2 Second Example

Figure 9:
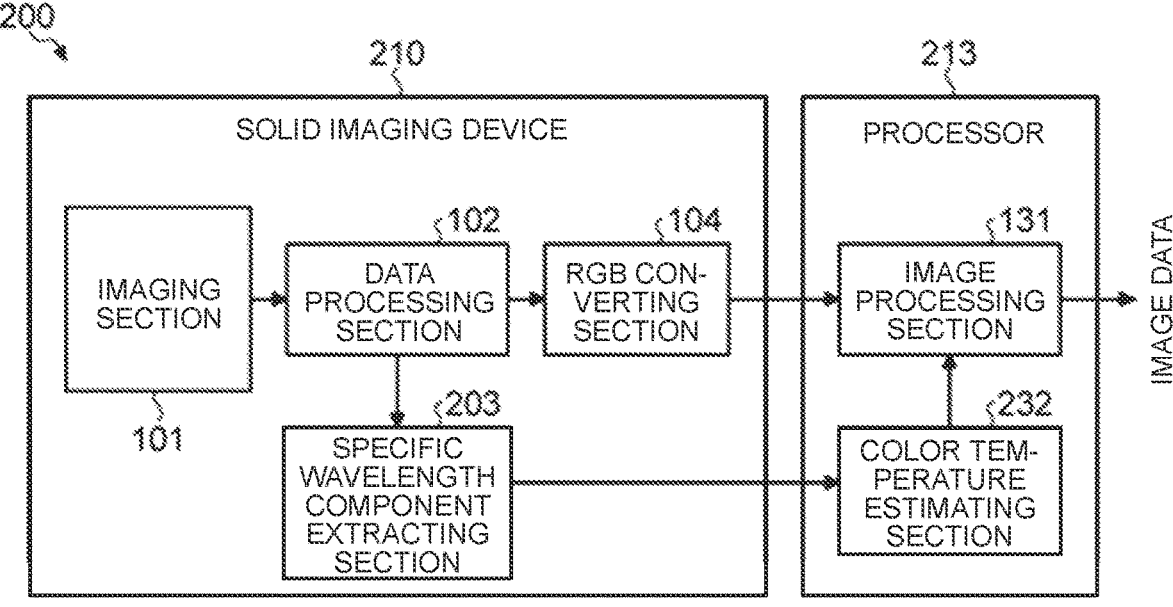
FIG. 9 is a block diagram depicting a schematic configuration example of an electronic device according to a second example of the one embodiment of the present disclosure.

Next, another specific example of a case where adjustment accuracy of white balance is improved in the electronic device 1 in which the pixel array section 21 compatible with multispectrum is employed will be described as a second example. FIG. 9 is a block diagram depicting a schematic configuration example of an electronic device according to the second example. Note that although configurations corresponding to the solid imaging device 10 and the processor 13 in the electronic device 1 depicted in FIG. 1 are extracted and depicted in FIG. 9, an electronic device 200 according to the second example may include an additional configuration such as another configuration not extracted from FIG. 1.

As depicted in FIG. 9, an electronic device 200 according to the second example includes a solid imaging device 210 and a processor 213. The solid imaging device 210 corresponds to the solid imaging device 10 in FIG. 1, and the processor 213 corresponds to the processor 13 in FIG. 1.

(Solid Imaging Device 210)

The solid imaging device 210 has a configuration in which the color temperature estimating section 103 is replaced with a specific wavelength component extracting section 203 in a configuration similar to that of the solid imaging device 110 described with reference to FIG. 8 in the first example.

The specific wavelength component extracting section 203 extracts specific wavelength image data from multispectral image data, and outputs the specific wavelength image data obtained thereby to the outside such as a processor 113. That is, in the present example, a part of color temperature estimation processing (in the present example, extraction of the specific wavelength image data from the multispectral image data) is configured to be executed in the solid imaging device 210. Note that a part of the processing executed in the solid imaging device 210 is not limited to the above, and may be changed in various manners.

(Processor 213)

The processor 213 has a configuration similar to that of the processor 113 described with reference to FIG. 8 in the first example, and further includes a color temperature estimating section 232 that estimates a color temperature of multispectral image data or RGB image data on the basis of the specific wavelength image data input from the specific wavelength component extracting section 203. That is, in the present example, the color temperature estimation processing executed on a side of the processor 213 is lighter than normal color temperature estimation processing using the multispectral image data. Color temperature information obtained by the color temperature estimating section 232 is input to an image processing section 131 and used for image processing such as a white balance adjustment in the image processing section 131.

As described above, since a configuration in which a part of the processing that is conventionally executed on a side of the processor 13 (in the present example, the color temperature estimation processing) is executed in the solid imaging device 210 is included, it becomes possible to reduce the processing to be executed in the external configuration. Thus, it becomes possible to control an increase in power consumption in the entire electronic device 200. Since other configurations, operations, and effects may be similar to those in the above-described example, a detailed description thereof is omitted here.

1.7.3 Third Example

For example, it is possible to obtain vital information of a user, such as a heart rate by observing a fluctuation of luminance of a wavelength component near 500 nanometers (nm). Thus, in the third example, a specific example of a case where vital information such as a heart rate is extracted from a specific wavelength component in multispectral image data in the electronic device 1 in which the pixel array section 21 compatible with multispectrum is employed will be described.

Figure 10:
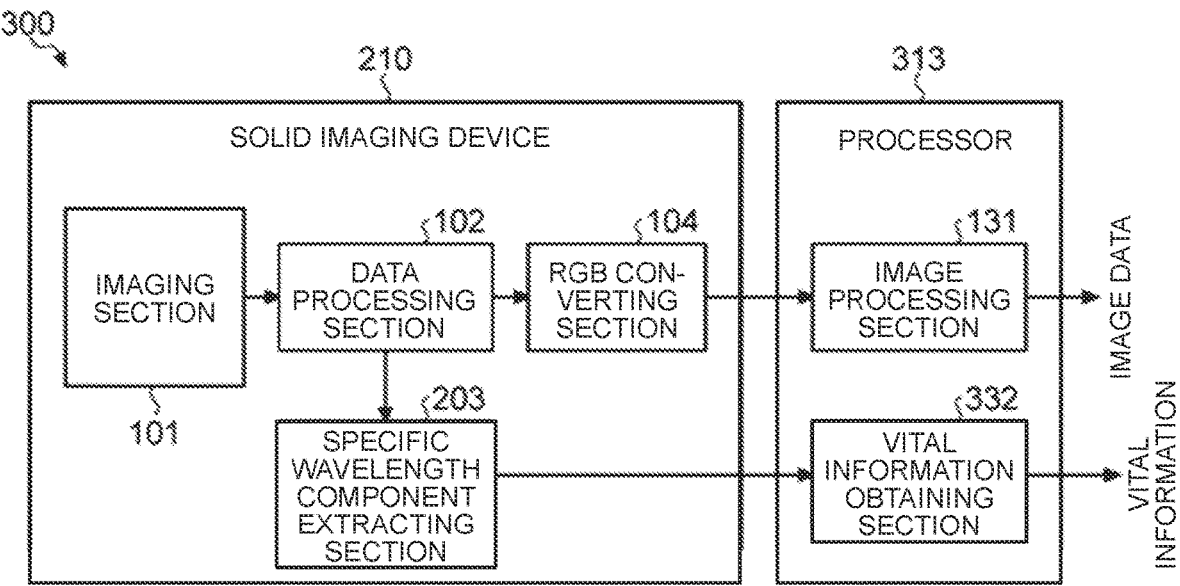
FIG. 10 is a block diagram depicting a schematic configuration example of an electronic device according to a third example of the one embodiment of the present disclosure.

FIG. 10 is a block diagram depicting a schematic configuration example of an electronic device according to the third example. Note that although configurations corresponding to the solid imaging device 10 and the processor 13 in the electronic device 1 depicted in FIG. 1 are extracted and depicted in FIG. 10, an electronic device 300 according to the third example may include an additional configuration such as another configuration not extracted from FIG. 1.

As depicted in FIG. 10, the electronic device 300 according to the third example includes a solid imaging device 210 and a processor 313. The solid imaging device 210 may be similar to the solid imaging device 210 described with reference to FIG. 9 in the second example. The processor 313 corresponds to the processor 13 in FIG. 1.

(Processor 313)

The processor 313 has a configuration similar to that of the processor 113 described with reference to FIG. 8 in the first example, and further includes a vital information obtaining section 332 that extracts vital information such as a heart rate, a respiratory rate, a body temperature, and a blood pressure on the basis of specific wavelength image data input from a specific wavelength component extracting section 203. That is, in the present example, a part of the vital information extraction processing of extracting the vital information such as the heart rate, the respiratory rate, the body temperature, and the blood pressure on the basis of image data (in the present example, extraction of specific wavelength image data from multispectral image data) is executed in the solid imaging device 210, and the remaining processing is executed on a side of the processor 313. As a result, in the present example, the vital information extraction processing executed on the side of the processor 313 is lighter than the normal vital information extraction processing using the multispectral image data. Note that a part of the processing executed in the solid imaging device 210 is not limited to the above, and may be changed in various manners. The vital information obtained by the vital information obtaining section 332 may be output to the outside via a predetermined network, or may be used inside the processor 313, for example.

As described above, since the configuration in which a part of the processing executed on the side of the processor 13 in the related art (in the present example, the vital information extraction processing) is executed in the solid imaging device 210 is included, it becomes possible to reduce processing to be executed in an external configuration similarly to the second example. Thus, it becomes possible to control an increase in power consumption in the entire electronic device 300. Since other configurations, operations, and effects may be similar to those in the above-described example, a detailed description thereof is omitted here.

1.8 Example of Output Timing

Here, output timing of the color temperature information and the specific wavelength image data estimated/extracted as described above will be described with examples.

1.8.1 Example of Output Timing of Color Temperature Information

Figure 11:
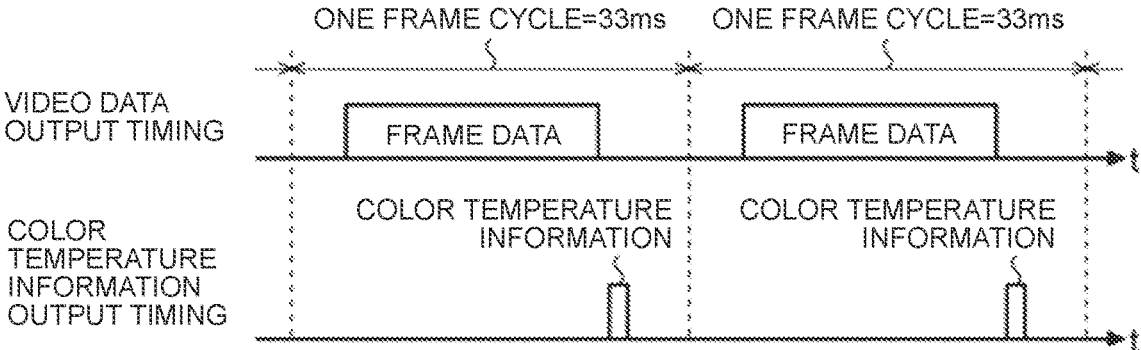
FIG. 11 is a timing chart depicting an example of an output timing of color temperature information estimated in the first example of the one embodiment of the present disclosure.

FIG. 11 is a timing chart depicting an example of output timing of the color temperature information estimated in the first example of the present embodiment. As depicted in FIG. 11, for example, in a case where the imaging section 101 outputs image data (also referred to as frame data) with one frame cycle as 33 milliseconds (ms), the color temperature information estimated by the color temperature estimating section 103 may be output during a period from completion of an output of the frame data in each frame cycle to before a start of a next frame cycle. Note that the color temperature information may be color temperature information estimated from frame data output in the same frame cycle, or may be color temperature information estimated from frame data output in a frame cycle preceding for one or more frame cycles.

1.8.2 Example of Output Timing of Specific Wavelength Image Data

Figure 12:
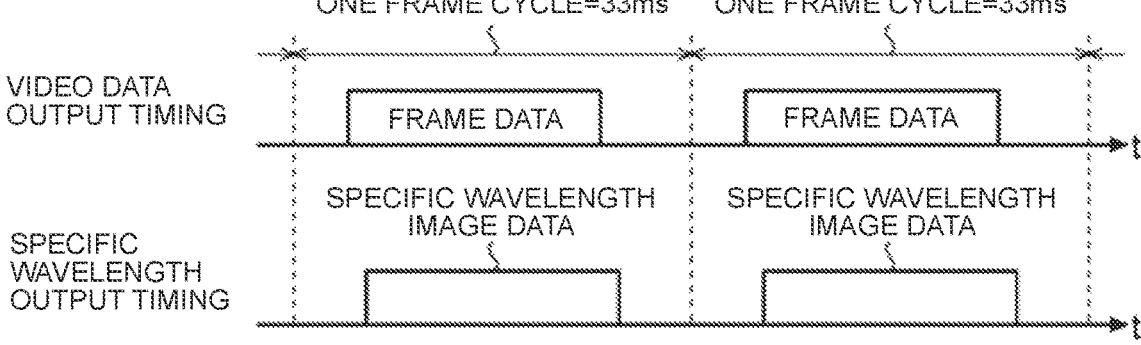
FIG. 12 is a timing chart depicting an example of an output timing of specific wavelength image data extracted in the second example or the third example of the one embodiment of the present disclosure.

FIG. 12 is a timing chart depicting an example of output timing of the specific wavelength image data extracted in the second example or the third example of the present embodiment. As depicted in FIG. 12, for example, in a case where the imaging section 101 outputs frame data with one frame cycle as 33 milliseconds (ns), the specific wavelength image data extracted by the specific wavelength component extracting section 203 may be output in parallel with the frame data in each frame cycle. At that time, output start timing of the specific wavelength image data may be the same as the output start timing of the frame data output in the same frame cycle, or may be delayed by one to several lines.

1.9 Conclusion

As described above, according to the present embodiment, since a configuration of converting multispectral image data into RGB image data in the solid imaging device 10 compatible with multispectrum is included, it becomes possible to employ an existing application for the RGB image data in the processor 13 that executes image processing on the image data output from the solid imaging device 10. As a result, it becomes possible to avoid redesigning of the application in such a manner as to correspond to the multispectral image data. Thus, it becomes possible to control an increase in a cost such as a development cost or a device cost and an increase in power consumption of the entire electronic device 1.

In addition, since the configuration of executing all or a part of processing on the multispectral image data in the solid imaging device 10 is included, for example, it becomes possible to avoid necessity of supplying the multispectral image data to an external configuration such as the processor 13 and necessity of processing the multispectral image data in the external configuration. Thus, it becomes possible to control an increase in a cost such as a development cost or a device cost and an increase in power consumption of the entire electronic device 1. Furthermore, in a case where a data amount of the RGB image data is reduced compared to a data amount of the multispectral image data, an amount of data transferred from the solid imaging device 10 to the external configuration can be reduced.

1.10 Modification Example

In each of the specific examples according to the above-described embodiment, the solid imaging device 10 includes the RGB converting section 104, whereby an existing application for an RGB image can be employed in the image processing section 131 on the side of the processor 13. However, in the present disclosure, it is not essential for the solid imaging device 10 to include the RGB converting section 104. Even when the solid imaging device 10 does not include the RGB converting section 104, it is possible to control an increase in a cost such as power consumption of the entire electronic device 1 by employing a configuration in which at least a part of processing on multispectral image data which processing is originally executed by the external processor 13 or the like is executed in the solid imaging device 10.

Thus, modification examples of the electronic device 1 (100, 200, or 300) according to a first embodiment will be described below with some examples.

1.10.1 First Modification Example

Figure 13:
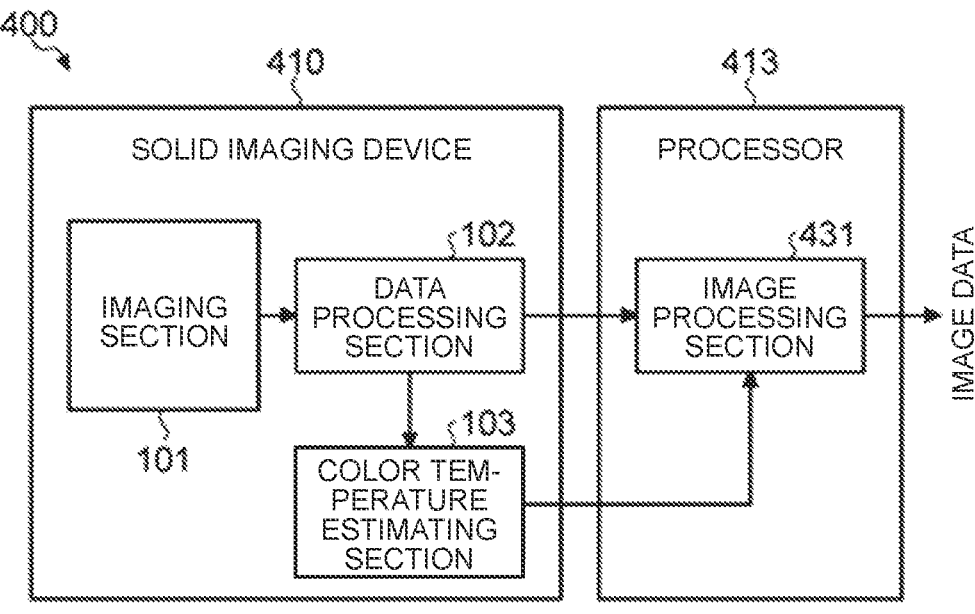
FIG. 13 is a block diagram depicting a schematic configuration example of an electronic device according to a first modification example of the one embodiment of the present disclosure.

First, a first modification example based on the above-described first example will be described. FIG. 13 is a block diagram depicting a schematic configuration example of an electronic device according to the first modification example.

As depicted in FIG. 13, an electronic device 400 according to the first modification example includes a solid imaging device 410 and a processor 413. The solid imaging device 410 corresponds to the solid imaging device 10 in FIG. 1, and the processor 413 corresponds to the processor 13 in FIG. 1.

(Solid Imaging Device 410)

The solid imaging device 410 has a configuration in which the RGB converting section 104 is omitted in a configuration similar to that of the solid imaging device 110 described with reference to FIG. 8 in the first example. That is, in the present modification example, multispectral image data output from a data processing section 102 is output to the outside such as the processor 413.

(Processor 413)

The processor 413 has a configuration in which the image processing section 131 in the processor 113 described with reference to FIG. 8 in the first example is replaced with an image processing section 431 a design of which has been changed to enable processing of multispectral image data. Color temperature information estimated by a color temperature estimating section 103 in the solid imaging device 410 is input to the image processing section 431. Thus, the image processing section 431 may execute image processing such as a white balance adjustment on multispectral image data on the basis of the color temperature information.

As described above, since a configuration in which the processing that is conventionally executed on a side of the processor 13 (in the present example, color temperature estimation processing) is executed in the solid imaging device 410 is included, it becomes possible to reduce the processing to be executed in the external configuration. Thus, it becomes possible to control an increase in power consumption in the entire electronic device 400. Since other configurations, operations, and effects may be similar to those in the above-described example, a detailed description thereof is omitted here.

1.10.2 Second Modification Example

Figure 14:
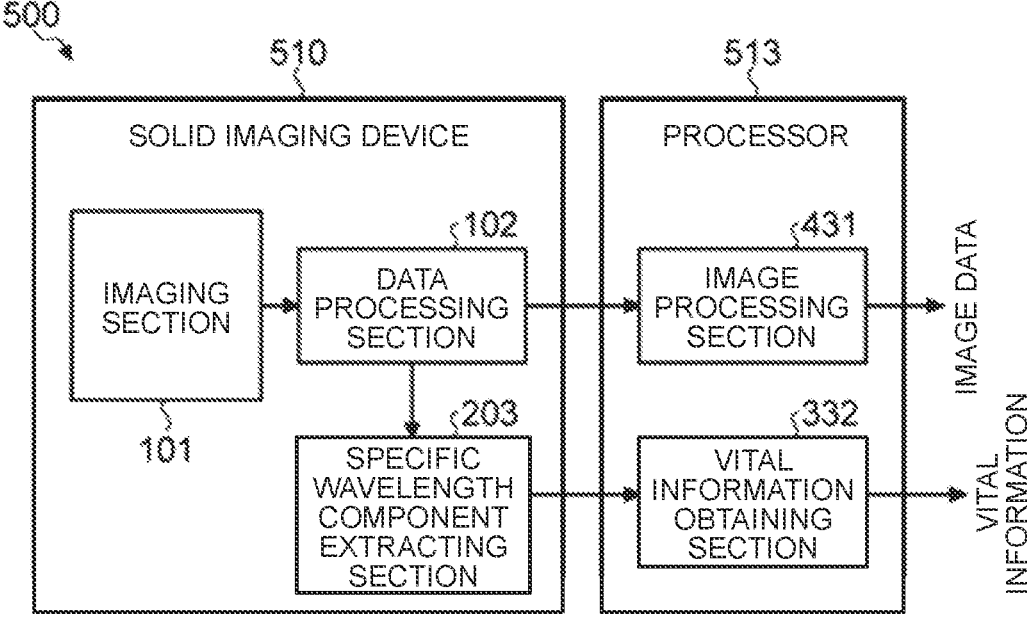
FIG. 14 is a block diagram depicting a schematic configuration example of an electronic device according to a second modification example of the one embodiment of the present disclosure.

Next, a second modification example based on the above-described third example will be described. FIG. 14 is a block diagram depicting a schematic configuration example of an electronic device according to the second modification example.

As depicted in FIG. 14, an electronic device 500 according to the second modification example includes a solid imaging device 510 and a processor 513. The solid imaging device 510 corresponds to the solid imaging device 10 in FIG. 1, and the processor 513 corresponds to the processor 13 in FIG. 1.

(Solid Imaging Device 510)

The solid imaging device 510 has a configuration in which the RGB converting section 104 is omitted in a configuration similar to that of the solid imaging device 210 described with reference to FIG. 10 in the third example. That is, in the present modification example, multispectral image data output from a data processing section 102 is output to the outside such as the processor 513 similarly to the first modification example.

(Processor 513)

Similarly to the first modification example, the processor 513 has a configuration in which the image processing section 131 in the processor 313 described with reference to FIG. 10 in the third example is replaced with an image processing section 431 a design of which has been changed to enable processing of multispectral image data.

As described above, since a configuration in which the processing that is conventionally executed on a side of the processor 13 (in the present example, vital information extraction processing) is executed in the solid imaging device 510 is included, it becomes possible to reduce the processing to be executed in the external configuration. Thus, it becomes possible to control an increase in power consumption in the entire electronic device 500. Since other configurations, operations, and effects may be similar to those in the above-described example, a detailed description thereof is omitted here.

1.10.3 Third Modification Example

Figure 15:
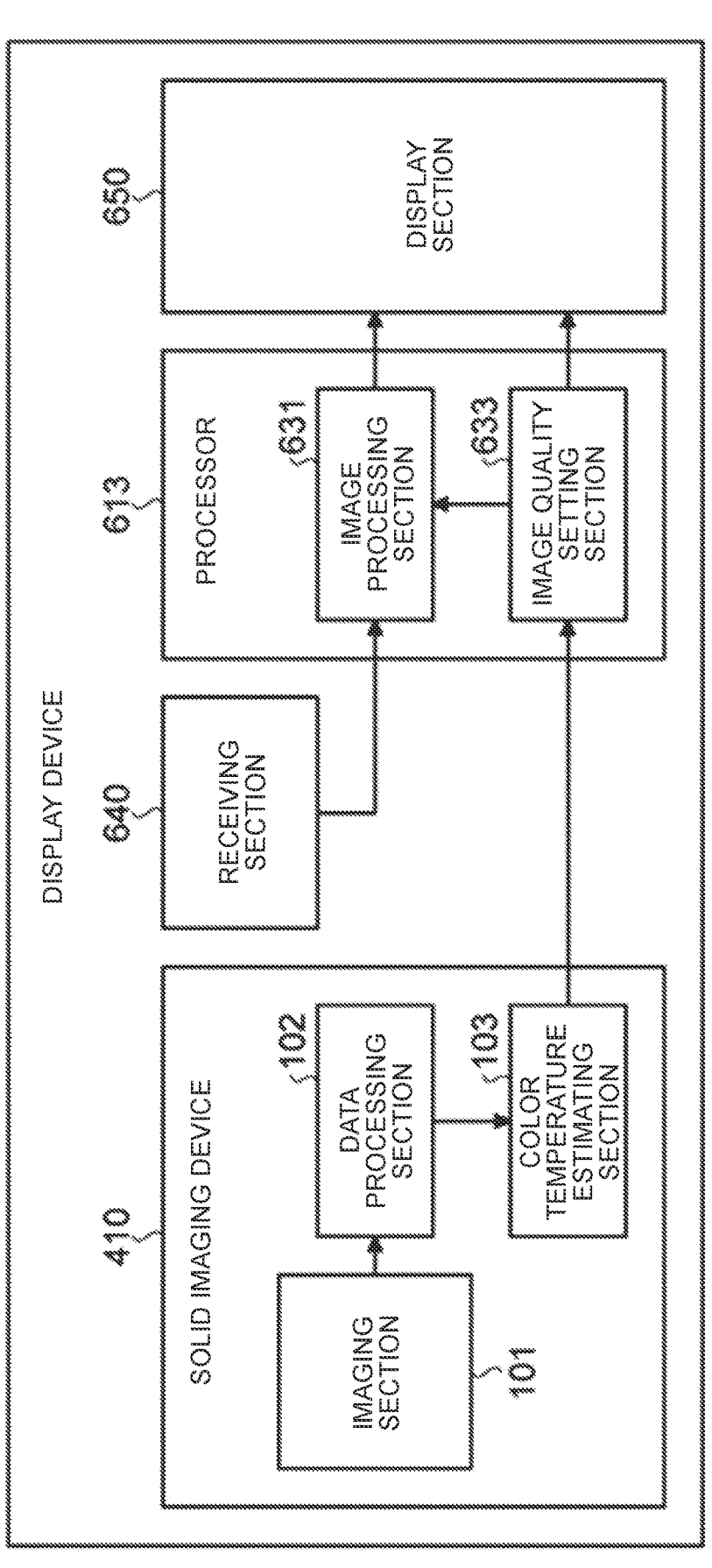
FIG. 15 is a block diagram depicting a schematic configuration example of an electronic device according to a third modification example of the one embodiment of the present disclosure.

Next, a case where the above-described first modification example is applied to a display device (one of electronic devices) such as a television will be described as a third modification example. FIG. 15 is a block diagram depicting a schematic configuration example of an electronic device according to the third modification example.

As depicted in FIG. 15, a display device 600 according to the third modification example includes, for example, a solid imaging device 410, a processor 613, a receiving section 640, and a display section 650. The solid imaging device 410 may be similar to the solid imaging device 410 described with reference to FIG. 13 in the first modification example. The processor 613 corresponds to the processor 13 in FIG. 1.

(Receiving Section 640)

For example, in a configuration of receiving a radio wave of television broadcasting, the receiving section 640 includes a receiving antenna, a tuning section, an orthogonal frequency division multiplexing (OFDM) modulator, an error correcting section, a demultiplexing section, a moving picture experts group (MPEG) decoding section, and the like, and restores video data from the received radio wave.

On the other hand, for example, in a configuration in which video data distributed via a network such as the Internet is received, the receiving section 640 includes a network interface card (NIC) such as a local area network (LAN) card, and restores the video data by reconstructing a packet received via the network.

(Display Section 650)

The display section 650 includes a display such as a liquid crystal panel or an organic electro-luminescence (EL) panel, and displays an image input from the processor 613 to a user.

(Processor 613)

The processor 613 includes an image processing section 631 and an image quality setting section 633.

For example, the image processing section 631 generates image data to be displayed on the display section 650 by executing predetermined processing such as image super-imposition on the video data input from the receiving section 640.

On the basis of color temperature information estimated by a color temperature estimating section 103 of the solid imaging device 410, the image quality setting section 633 calculates image quality setting values such as brightness and a hue of an image (including video) displayed on the display section 650. Note that the calculated image quality setting value may be set on the display section 650 to adjust image quality such as brightness and a hue of an image (including video) displayed on the display section 650, or may be input to the image processing section 631 to adjust image quality such as brightness and a hue of image data input to the display section 650 in the image processing section 631.

As described above, since a configuration in which the processing that is conventionally executed on a side of the processor 13 (in the present example, color temperature estimation processing) is executed in the solid imaging device 410 is included, it becomes possible to reduce the processing to be executed in the external configuration similarly to the first modification example. Thus, it becomes possible to control an increase in power consumption in the entire display device 600. Since other configurations, operations, and effects may be similar to those in the above-described example, a detailed description thereof is omitted here.

2. Hardware Configuration

Figure 16:
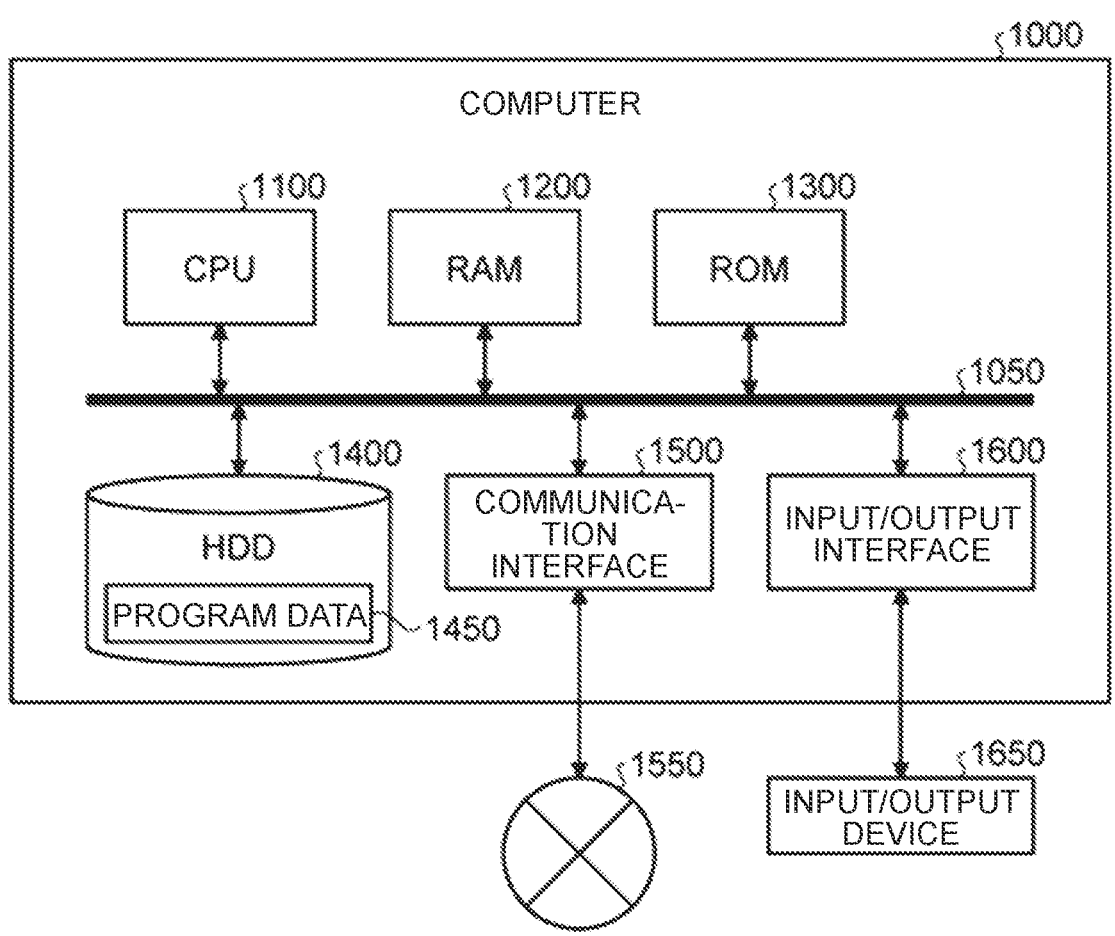
FIG. 16 is a hardware configuration diagram depicting an example of a computer according to the one embodiment of the present disclosure.

The processors 13, 113, 213, 313, 413, 513, and 613 according to the above-described embodiment, modification examples, and application example can be realized by a computer 1000 having a configuration in a manner depicted in FIG. 16, for example. FIG. 16 is a hardware configuration diagram depicting an example of the computer 1000 that realizes the functions of the processors 13, 113, 213, 313, 413, 513, and 613. The computer 1000 includes a CPU 1100, a RAM 1200, a read only memory (ROM) 1300, a hard disk drive (HDD) 1400, a communication interface 1500, and an input/output interface 1600. Each section of the computer 1000 is connected by a bus 1050.

The CPU 1100 operates on the basis of programs stored in the ROM 1300 or the HDD 1400, and controls each section. For example, the CPU 1100 expands the programs, which are stored in the ROM 1300 or the HDD 1400, in the RAM 1200 and executes processing corresponding to the various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records a program executed by the CPU 1100, data used by the program, and the like. Specifically, the HDD 1400 is a recording medium that records a program for executing each operation according to the present disclosure which program is an example of program data 1450.

The communication interface 1500 is an interface for the computer 1000 to connect to an external network 1550 (such as the Internet). For example, via the communication interface 1500, the CPU 1100 receives data from another device or transmits data generated by the CPU 1100 to another device.

The input/output interface 1600 includes the above-described I/F section 18, and is an interface for connecting an input/output device 1650 and the computer 1000. For example, the CPU 1100 receives data from an input device such as a keyboard or mouse via the input/output interface 1600. Furthermore, the CPU 1100 transmits data to an output device such as a display, a speaker, or a printer via the input/output interface 1600. Furthermore, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the processors 13, 113, 213, 313, 413, 513, and 613 according to the above-described embodiment, the CPU 1100 of the computer 1000 realizes the functions of the processors 13, 113, 213, 313, 413, 513, and 613 by executing the program loaded on the RAM 1200. Also, the HDD 1400 stores a program and the like related to the present disclosure. Note that the CPU 1100 reads the program data 1450 from the HDD 1400 and performs execution thereof, but may obtain these programs from another device via the external network 1550 in another example.

3. Example of Application to a Smartphone

Figure 17:
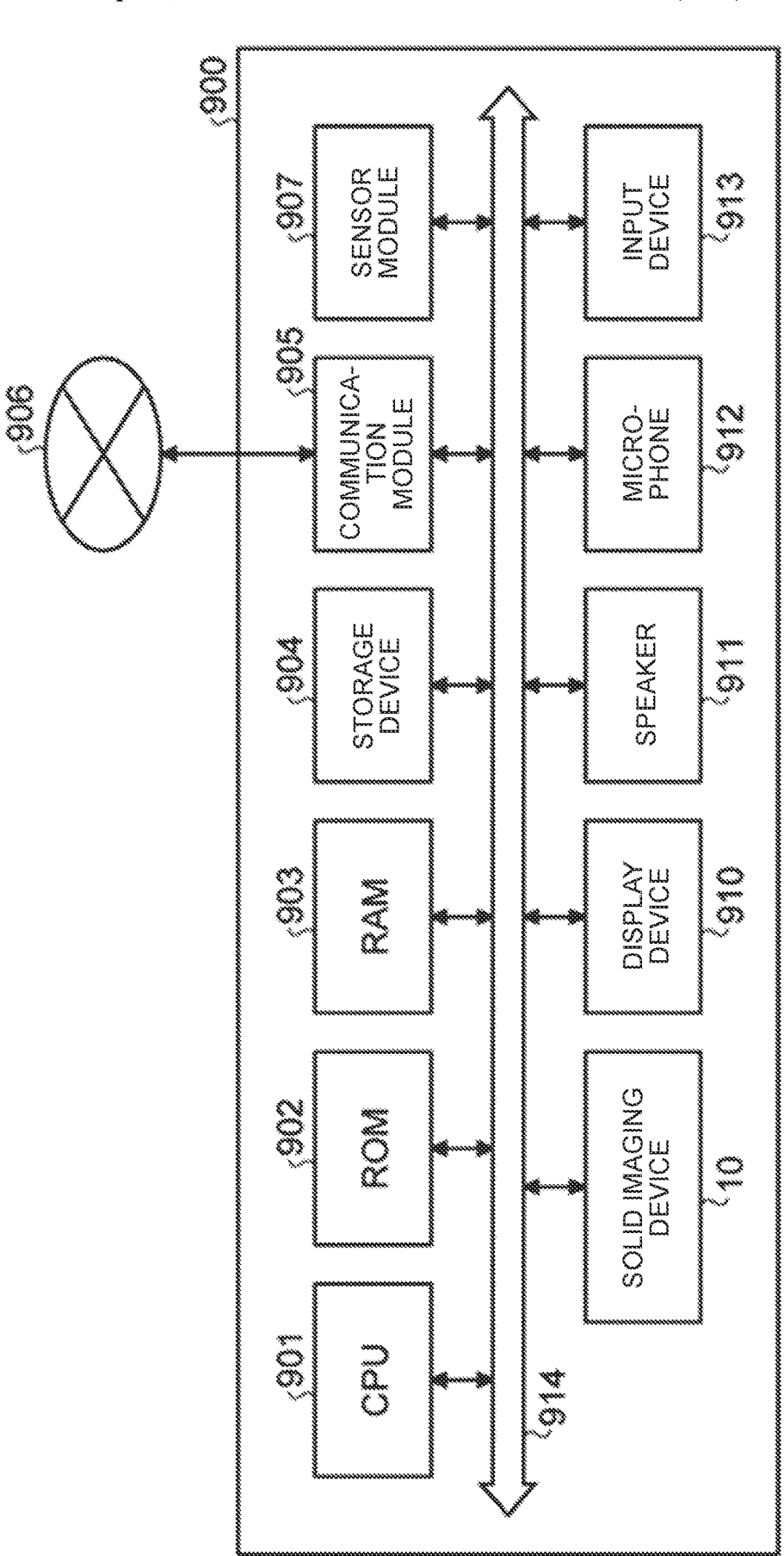
FIG. 17 is a block diagram depicting an example of a schematic functional configuration of a smartphone.

A technology according to the present disclosure (present technology) can be further applied to various products. For example, the technology according to the present disclosure may be applied to a smartphone or the like. Thus, a configuration example of a smartphone 900 as an electronic device to which the present technology is applied will be described with reference to FIG. 17. FIG. 17 is a block diagram depicting an example of a schematic functional configuration of a smartphone 900 to which the technology according to the present disclosure (the present technology) can be applied.

As depicted in FIG. 17, the smartphone 900 includes a central processing unit (CPU) 901, a read only memory (ROM) 902, and a random access memory (RAM) 903. In addition, the smartphone 900 includes a storage device 904, a communication module 905, and a sensor module 907. Furthermore, the smartphone 900 includes a solid imaging device 10, a display device 910, a speaker 911, a microphone 912, an input device 913, and a bus 914. Furthermore, the smartphone 900 may include a processing circuit such as a digital signal processor (DSP) instead of or in addition to the CPU 901.

The CPU 901 functions as an arithmetic processing device and a control device, and controls an overall operation in the smartphone 900 or a part thereof according to various programs recorded in the ROM 902, the RAM 903, the storage device 904, or the like. The ROM 902 stores programs used by the CPU 901, operation parameters, and the like. The RAM 903 performs primary storing of the programs used in execution of the CPU 901, parameters that appropriately change in the execution, and the like. The CPU 901, the ROM 902, and the RAM 903 are connected to each other by the bus 914. In addition, the storage device 904 is a device for data storage which device is configured as an example of a storage section of the smartphone 900. The storage device 904 includes, for example, a magnetic storage device such as a hard disk drive (HDD), a semiconductor storage device, an optical storage device, or the like. The storage device 904 stores programs executed by the CPU 901, various kinds of data, various kinds of data obtained from the outside, and the like.

The communication module 905 is, for example, a communication interface including a communication device or the like for connection to a communication network 906. The communication module 905 may be, for example, a communication card for a wired or wireless local area network (LAN), Bluetooth (registered trademark), a wireless USB (WUSB), or the like. Furthermore, the communication module 905 may be a router for optical communication, a router for an asymmetric digital subscriber line (ADSL), a modem for various kinds of communication, or the like. The communication module 905 transmits and receives a signal or the like to and from the Internet or another communication device by using a predetermined protocol such as transmission control protocol (TCP)/Internet protocol (IP). Furthermore, the communication network 906 connected to the communication module 905 is a network connected in a wired or wireless manner, and is, for example, the Internet, a home LAN, infrared communication, satellite communication, or the like.

The sensor module 907 includes, for example, various sensors such as a motion sensor (such as an acceleration sensor, a gyroscope sensor a geomagnetic sensor, or the like), a biological information sensor (such as a pulse sensor, a blood pressure sensor, a fingerprint sensor, or the like), or a position sensor (such as a global navigation satellite system (GNSS) receiver or the like).

The solid imaging device 10 is provided on a surface of the smartphone 900, and can image an object or the like located on a back side or a front side of the smartphone 900. Specifically, the solid imaging device 10 can include an imaging element (not depicted) such as a complementary MOS (CMOS) image sensor to which the technology according to the present disclosure (present technology) can be applied, and a signal processing circuit (not depicted) that performs imaging signal processing on a signal photoelectrically converted by the imaging element. Furthermore, the solid imaging device 10 can further include an optical system mechanism (not depicted) including an imaging lens, a zoom lens, a focus lens, and the like, and a driving system mechanism (not depicted) that controls an operation of the optical system mechanism. Then, the imaging element collects incident light from an object as an optical image, and the signal processing circuit can obtain a captured image by photoelectrically converting the formed optical image in units of pixels, reading a signal of each pixel as an imaging signal, and performing image processing.

The display device 910 is provided on the surface of the smartphone 900, and can be, for example, a display device such as a liquid crystal display (LCD) or an organic electro luminescence (EL) display. The display device 910 can display an operation screen, the captured image obtained by the above-described solid imaging device 10, and the like.

The speaker 911 can output, for example, a call voice, a voice accompanying video content displayed by the display device 910 described above, and the like to a user.

The microphone 912 can collect, for example, a call voice of the user, a voice including a command to activate a function of the smartphone 900, and sound in a surrounding environment of the smartphone 900.

The input device 913 is a device operated by the user, such as a button, a keyboard, a touch panel, or a mouse. The input device 913 includes an input control circuit that generates an input signal on the basis of information input by the user and performs an output thereof to the CPU 901. By operating the input device 913, the user can input various kinds of data to the smartphone 900 and give an instruction on a processing operation.

The configuration example of the smartphone 900 has been described above. Each of the above-described components may be configured by utilization of a general-purpose member, or may be configured by hardware specialized for the function of each component. Such a configuration can be appropriately changed according to a technical level at the time of implementation.

4. Example of Application to a Mobile Body

A technology according to the present disclosure (present technology) can be applied to various products. For example, the technology according to the present disclosure may be realized as a device mounted on any type of mobile bodies such as an automobile, an electric vehicle, a hybrid electric vehicle, a motorcycle, a bicycle, a personal mobility device, an airplane, a drone, a ship, and a robot.

Figure 18:
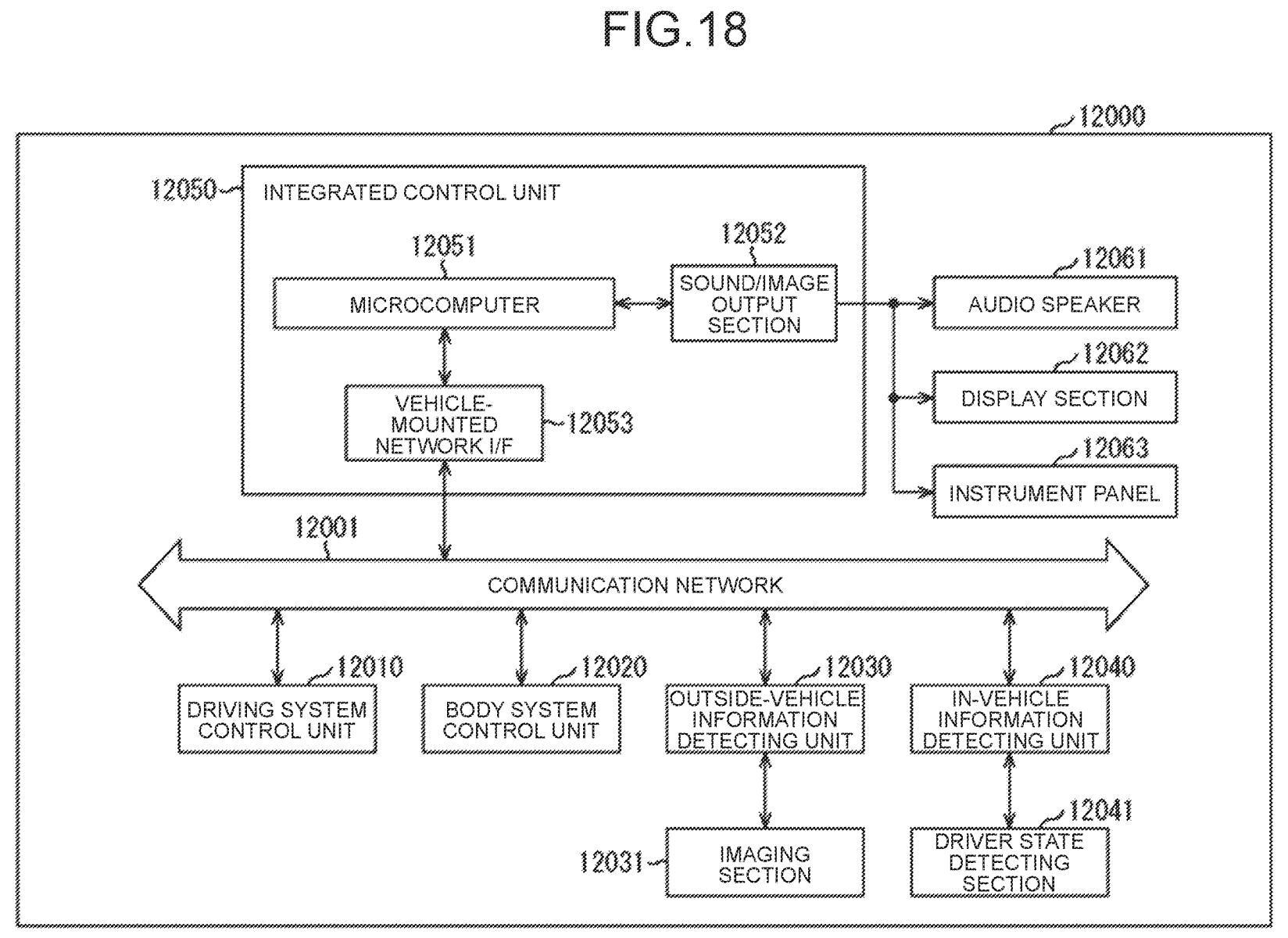

FIG. 18 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 18, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 18, an audio speaker 12061, a display section 12062, and an instrument panel 12063 are illustrated as the output device. The display section 12062 may, for example, include at least one of an on-board display and a head-up display.

Figure 19:
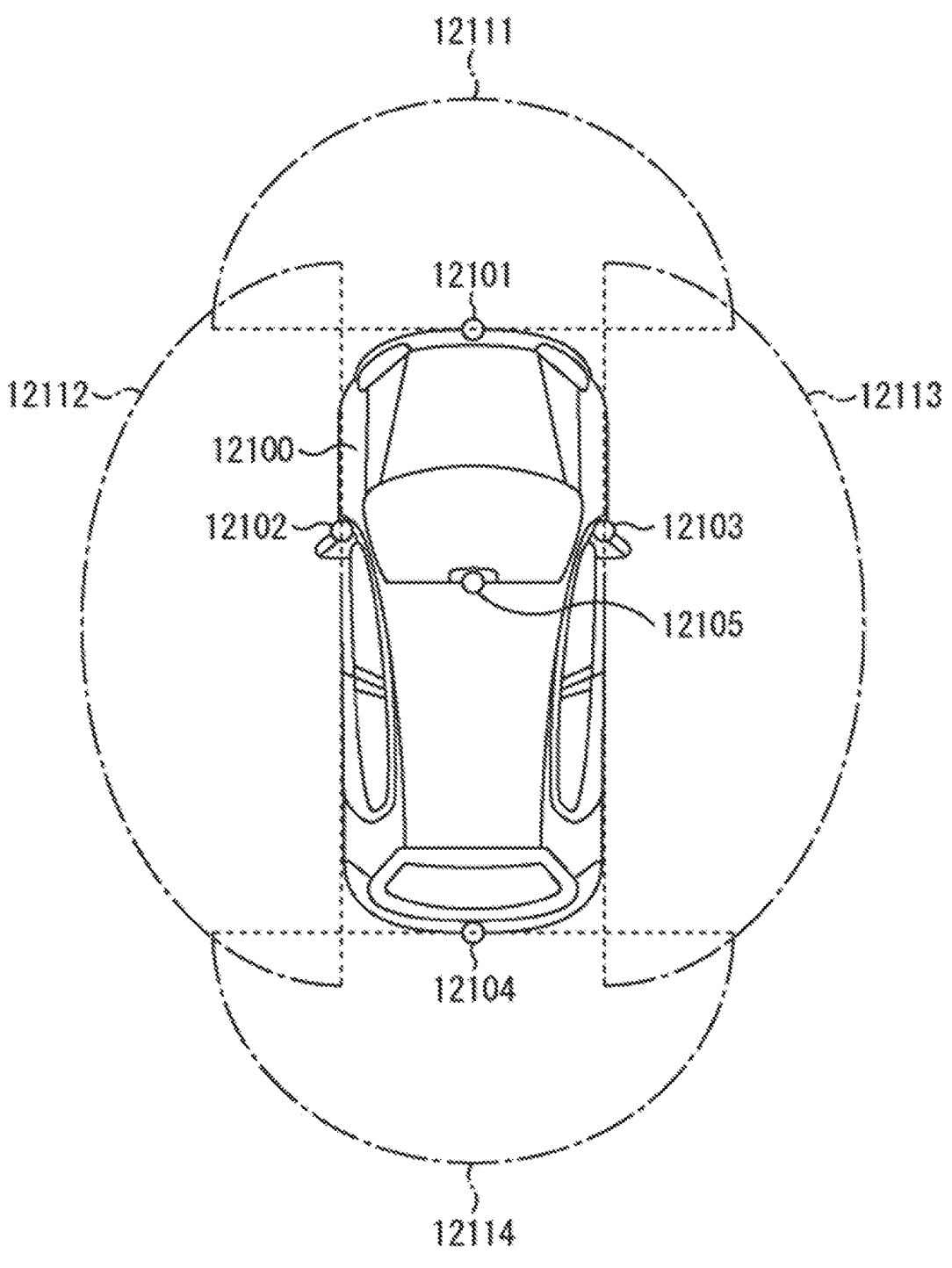
FIG. 19 is a diagram of assistance in explaining an example of installation positions of an outside-vehicle information detecting section and an imaging section.

FIG. 19 is a diagram depicting an example of the installation position of the imaging section 12031.

In FIG. 19, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of a vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 19 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031, the in-vehicle information detecting unit 12040, the outside-vehicle information detecting unit 12030, or the like among the above-described configurations. By applying the technology according to the present disclosure to the imaging section 12031, and the in-vehicle information detecting unit 12040 or the outside-vehicle information detecting unit 12030, it becomes possible to more accurately obtain information related to the driver and surroundings of the vehicle, and thus, it becomes possible to realize safer driving support and automatic driving.

5. Example of Application to an Endoscopic

Surgery System A technology according to the present disclosure (present technology) can be applied to various products. For example, the technology according to the present disclosure may be applied to an endoscopic surgery system or the like.

Figure 20:
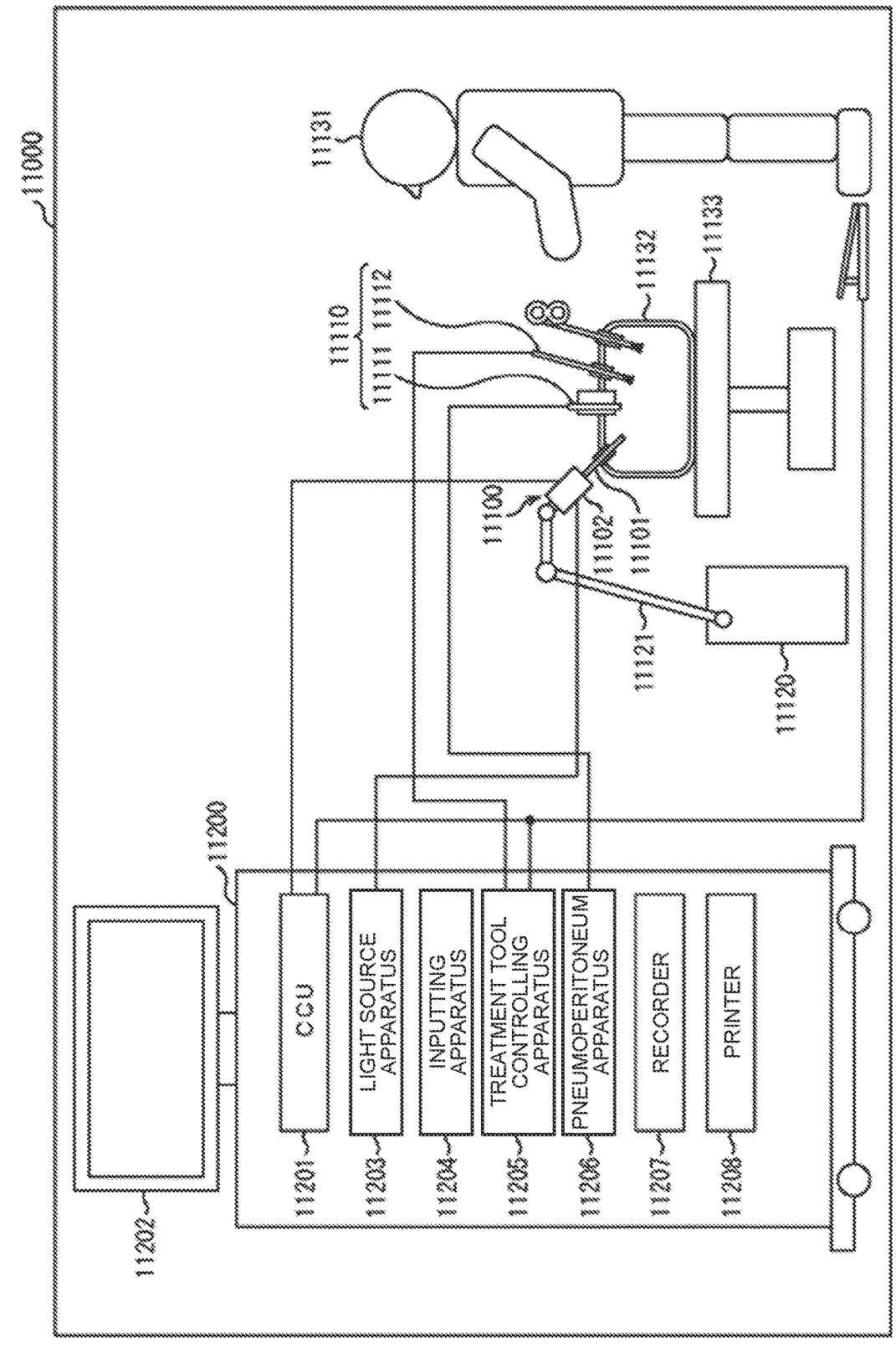
FIG. 20 is a view depicting an example of a schematic configuration of an endoscopic surgery system.

FIG. 20 is a view depicting an example of a schematic configuration of an endoscopic surgery system to which the technology according to an embodiment of the present disclosure (present technology) can be applied.

In FIG. 20, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy treatment tool 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. In the example depicted, the endoscope 11100 is depicted which includes as a hard mirror having the lens barrel 11101 of the hard type. However, the endoscope 11100 may otherwise be included as a soft mirror having the lens barrel 11101 of the soft type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body lumen of the patient 11132 through the objective lens. It is to be noted that the endoscope 11100 may be a direct view mirror or may be a perspective view mirror or a side view mirror.

An optical system and an image pickup element are provided in the inside of the camera head 11102 such that reflected light (observation light) from the observation target is condensed on the image pickup element by the optical system. The observation light is photoelectrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy treatment tool 11112 for cautery or incision of a tissue, sealing of a blood vessel or the like. A pneumoperitoneum apparatus 11206 feeds gas into a body lumen of the patient 11132 through the pneumoperitoneum tube 11111 to inflate the body lumen in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 21:
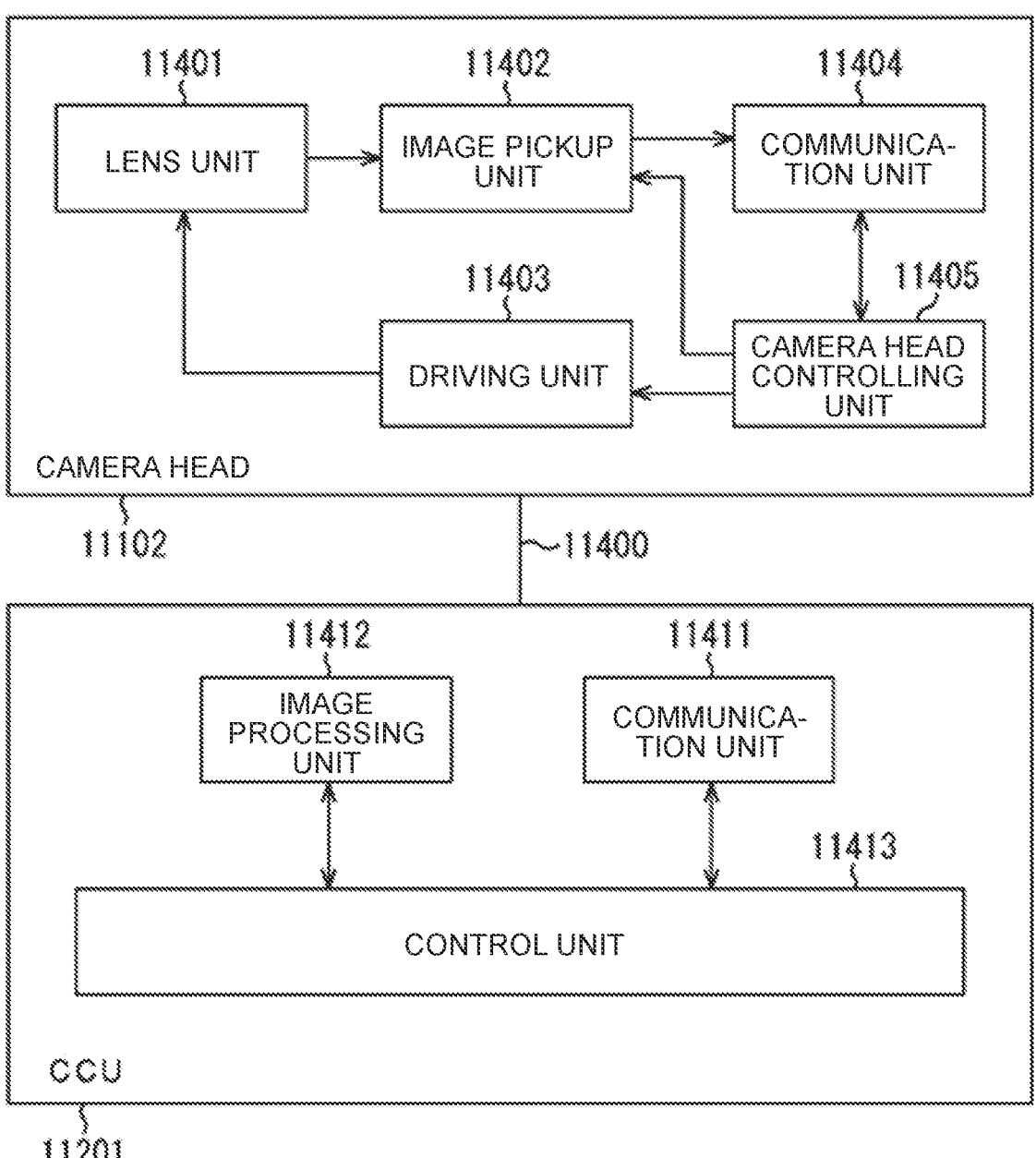
FIG. 21 is a block diagram depicting an example of a functional configuration of a camera head and a camera control unit (CCU).

FIG. 21 is a block diagram depicting an example of a functional configuration of the camera head 11102 and the CCU 11201 depicted in FIG. 20.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy treatment tool 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the present disclosure can be applied has been described above. The technology according to the present disclosure can be applied to, for example, the imaging section 11402 of the camera head 11102, the CCU 11201, and the like among the above-described configurations. By applying the technology according to the present disclosure to the camera head 11102, the CCU 11201, and the like, it becomes possible to present more detailed information to the surgeon, whereby it is possible to cause the surgeon to perform a safer and more accurate surgery.

Note that although the endoscopic surgery system has been described as an example here, the technology according to the present disclosure may be applied to, for example, a microscopic surgery system or the like.

Although embodiments of the present disclosure have been described above, the technical scope of the present disclosure is not limited to the above-described embodiments as they are, and various modifications can be made within the spirit and scope of the present disclosure. In addition, components of different embodiments and modification examples may be arbitrarily combined.

Also, an effect in each of the embodiments described in the present specification is merely an example and is not a limitation, and there may be another effect.

Note that the present technology can also have the following configurations.

(1)
A solid imaging device including:
an imaging section that obtains first image data including four or more colors; and
a converting section that reduces a number of colors of the first image data obtained by the imaging section and generates second image data having a smaller number of colors than the first image data.

(2)
The solid imaging device according to (1), wherein
the imaging section includes
a first pixel that photoelectrically converts light of a red wavelength component,
a second pixel that photoelectrically converts light of a green wavelength component,
a third pixel that photoelectrically converts light of a blue wavelength component, and
a fourth pixel that photoelectrically converts light of a wavelength component different from those of the first pixel, the second pixel, and the third pixel.

(3)
The solid imaging device according to (1) or (2), further including
a processing section that executes predetermined processing on the first image data.

(4)
The solid imaging device according to (3), wherein
the processing section is an estimating section that estimates a color temperature from the first image data.

(5)
The solid imaging device according to (3), wherein
the processing section is an extracting section that extracts a specific wavelength component from the first image data and generates third image data.

(6)
An electronic device including
the solid imaging device according to (1); and
a processor that process image data output from the solid imaging device, wherein
the solid imaging device further includes a processing section that executes predetermined processing on the first image data.

(7)
The electronic device according to (6), wherein
the processor includes an image processing section that executes predetermined image processing on the second image data on a basis of a result of the processing by the processing section.

(8)
The electronic device according to (7), wherein
the processing section is an estimating section that estimates a color temperature from the first image data, and
the image processing section executes the predetermined image processing on the second image data on a basis of the color temperature information estimated by the estimating section.

(9)
The electronic device according to (7), wherein
the processing section is an extracting section that extracts a specific wavelength component from the first image data and generates third image data, and
the processor further includes an estimating section that estimates a color temperature from the third image data generated by the extracting section, and
the image processing section executes the predetermined image processing on the second image data on a basis of color temperature information estimated by the estimating section.

(10)
The electronic device according to (8) or (9), wherein
the predetermined image processing is a white balance adjustment.

(11)
The electronic device according to any one of (6) to (10), wherein
the processing section is an extracting section that extracts a specific wavelength component from the first image data and generates third image data, and
the processor includes an obtaining section that obtains vital information of a user on a basis of the third image data generated by the extracting section.

(12)
The electronic device according to (11), wherein
the vital information includes at least one of a heart rate, a respiratory rate, a body temperature, and a blood pressure of the user.

(13)
A method of controlling a solid imaging device including an imaging section that obtains first image data including four or more colors, the method including:
controlling the imaging section to obtain the first image data including the four or more colors; and
reducing a number of colors of the first image data obtained by the imaging section and generating second image data having a smaller number of colors than the first image data.

(14)
A solid imaging device including:
an imaging section that obtains first image data including four or more colors; and
a processing section that executes predetermined processing on the first image data.

REFERENCE SIGNS LIST 1, 100, 200, 300, 400, 500 ELECTRONIC DEVICE
10, 110, 210, 410, 510 SOLID IMAGING DEVICE
11 IMAGING LENS
13, 113, 213, 313, 413, 513, 613 PROCESSOR
14 STORAGE SECTION
21 PIXEL ARRAY SECTION
22 VERTICAL DRIVING CIRCUIT
23 COLUMN PROCESSING CIRCUIT
24 HORIZONTAL DRIVING CIRCUIT
25 SYSTEM CONTROL SECTION

26 SIGNAL PROCESSING SECTION
27 DATA STORAGE SECTION
30, 30R, 30G, 30B, 30Cy, 30Ma, 30Y, 30W, 30Bl, 30Gr, 30IR PIXEL
41 LIGHT RECEIVING CHIP
42 CIRCUIT CHIP
101 IMAGING SECTION
102 DATA PROCESSING SECTION
103, 232 COLOR TEMPERATURE ESTIMATING SECTION
104 RGB CONVERTING SECTION
131, 431, 631 IMAGE PROCESSING SECTION
203 SPECIFIC WAVELENGTH COMPONENT EXTRACTING SECTION
332 VITAL INFORMATION OBTAINING SECTION
600 DISPLAY DEVICE
633 IMAGE QUALITY SETTING SECTION
640 RECEIVING SECTION
650 DISPLAY SECTION

The invention claimed is:

1. A solid imaging device including:

an imaging section that obtains first image data including four or more visible colors;

a converting section that reduces a number of colors of the first image data obtained by the imaging section and generates second image data having a smaller number of colors than the first image data; and a processing section that executes predetermined processing on the first image data, wherein the processing section estimates a color temperature based upon all of the four or more visible colors of the first image data.

2. The solid imaging device according to claim 1, wherein the imaging section includes a first pixel that photoelectrically converts light of a red wavelength component, a second pixel that photoelectrically converts light of a green wavelength component, a third pixel that photoelectrically converts light of a blue wavelength component, and a fourth pixel that photoelectrically converts light of a wavelength component different from those of the first pixel, the second pixel, and the third pixel.

3. The solid imaging device according to claim 1, wherein the processing section is an extracting section that extracts a specific wavelength component from the first image data and generates third image data.

4. The solid imaging device according to claim 1, wherein the four or more visible colors of the first image data are red, green, blue and white.

5. The solid imaging device according to claim 1, wherein the four or more visible colors of the first image data are red, green, blue and another color different from red, green and blue.

6. An electronic device comprising:

a solid imaging device including:

an imaging section that obtains first image data including four or more colors, a converting section that reduces a number of colors of the first image data obtained by the imaging section and generates second image data having a smaller number of colors than the first image data, and a processing section that executes predetermined processing on the first image data; and a processor that process image data output from the solid imaging device, wherein the processing section is an extracting section that extracts a specific wavelength component from the first image data and generates third image data, and the processor includes an obtaining section that obtains vital information of a user on a basis of the third image data generated by the extracting section.

7. The electronic device according to claim 6, wherein the vital information includes at least one of a heart rate, a respiratory rate, a body temperature, and a blood pressure of the user.

8. An electronic device comprising:

a solid imaging device including:

an imaging section that obtains first image data including four or more colors, a converting section that reduces a number of colors of the first image data obtained by the imaging section and generates second image data having a smaller number of colors than the first image data, and a processing section that executes predetermined processing on the first image data; and a processor that process image data output from the solid imaging device, wherein the processor includes an image processing section that executes predetermined image processing on the second image data on a basis of a result of the processing by the processing section, the processing section is an estimating section that estimates a color temperature from the first image data, and the image processing section executes the predetermined image processing on the second image data on a basis of the color temperature estimated by the estimating section.

9. The electronic device according to claim 8, wherein the processing section is an extracting section that extracts a specific wavelength component from the first image data and generates third image data, and the processor further includes an estimating section that estimates a color temperature from the third image data generated by the extracting section, and the image processing section executes the predetermined image processing on the second image data on a basis of color temperature information estimated by the estimating section.

10. The electronic device according to claim 8, wherein the predetermined image processing is a white balance adjustment.

* * * * *